(12) United States Patent
Richards

(10) Patent No.: US 7,151,490 B2
(45) Date of Patent: Dec. 19, 2006

(54) SYSTEM AND METHOD FOR ESTIMATING SEPARATION DISTANCE BETWEEN IMPULSE RADIOS USING IMPULSE SIGNAL AMPLITUDE

(75) Inventor: James L. Richards, Fayetteville, TN (US)

(73) Assignee: Time Domain Corporation, Huntsville, AL (US)

( * ) Notice: Subject to any disclaimer, the term of this patent is extended or adjusted under 35 U.S.C. 154(b) by 290 days.

(21) Appl. No.: 10/782,771

(22) Filed: Feb. 23, 2004

(65) Prior Publication Data

US 2005/0184908 A1    Aug. 25, 2005

Related U.S. Application Data

(63) Continuation of application No. 09/537,263, filed on Mar. 29, 2000, now Pat. No. 6,700,538.

(51) Int. Cl.
*G01S 3/02* (2006.01)

(52) U.S. Cl. ........................... 342/458; 342/463

(58) Field of Classification Search ............ 342/453, 342/458, 463
See application file for complete search history.

(56) References Cited

U.S. PATENT DOCUMENTS

| | | |
|---|---|---|
| 3,068,473 A | 12/1962 | Muth |
| 3,213,449 A | 10/1965 | Kobayashi |
| 3,376,504 A | 4/1968 | Chick |
| 3,396,393 A | 8/1968 | Wagner |
| 3,461,452 A | 8/1969 | Welter |
| 4,112,421 A | 9/1978 | Freeny, Jr. |
| 4,161,730 A | 7/1979 | Anderson |
| 4,315,260 A | 2/1982 | Kupfer |
| 4,543,580 A | 9/1985 | Bent et al. |
| 4,641,317 A | 2/1987 | Fullerton |
| 4,743,906 A | 5/1988 | Fullerton |
| 4,813,057 A | 3/1989 | Fullerton |
| 4,901,307 A | 2/1990 | Gilhousen et al. |
| 4,916,429 A | 4/1990 | Hicks et al. |
| 4,916,455 A | 4/1990 | Bent et al. |
| 4,979,186 A | 12/1990 | Fullerton |
| 5,216,429 A | 6/1993 | Nakagawa |
| 5,247,311 A | 9/1993 | Sobocinski |
| 5,499,029 A | 3/1996 | Bashforth et al. |
| 5,510,800 A | 4/1996 | McEwan |

(Continued)

FOREIGN PATENT DOCUMENTS

WO    WO 99/49333    9/1999

(Continued)

OTHER PUBLICATIONS

English Language Abstract of Japanese Publication No. 05-172934, Toshie, H., "Method for Measuring Distance Between Transmitter and Receiver," (Jul. 1993, 1 page.

(Continued)

*Primary Examiner*—Dao L. Phan
(74) *Attorney, Agent, or Firm*—Venable LLP; Robert S. Babayi

(57) ABSTRACT

A method and system are provided for locating an impulse radio. Impulse radio signals are communicated between a first impulse radio and a plurality of second impulse radios. A received signal strength measurement is determined for each of the impulse radio signals. One of a plurality of radio propagation path models is selected and used to estimate a plurality of separation distances between the first impulse radio and the plurality of second impulse radios. The plurality of separation distances is used to determine a location relating to the first impulse radio.

24 Claims, 19 Drawing Sheets

U.S. PATENT DOCUMENTS

| | | |
|---|---|---|
| 5,552,772 A | 9/1996 | Janky et al. |
| 5,589,838 A | 12/1996 | McEwan |
| 5,610,907 A | 3/1997 | Barrett |
| 5,661,490 A | 8/1997 | McEwan |
| 5,661,492 A | 8/1997 | Shoap et al. |
| 5,666,662 A | 9/1997 | Shibuya |
| 5,677,927 A | 10/1997 | Fullerton |
| 5,687,169 A | 11/1997 | Fullerton |
| 5,748,891 A | 5/1998 | Fleming et al. |
| 5,796,366 A | 8/1998 | Grebnev et al. |
| 5,832,035 A | 11/1998 | Fullerton |
| 5,847,677 A | 12/1998 | McCorkle |
| 5,912,644 A | 6/1999 | Wang |
| 5,933,079 A | 8/1999 | Frink |
| 6,002,708 A | 12/1999 | Fleming et al. |
| 6,040,800 A | 3/2000 | Raith et al. |
| 6,054,950 A | 4/2000 | Fontana |
| 6,104,337 A | 8/2000 | Coutts et al. |

FOREIGN PATENT DOCUMENTS

| | | |
|---|---|---|
| WO | WO 99/61936 | 12/1999 |

OTHER PUBLICATIONS

Copy of International Search Report, Appl. No. PCT/US01/09947, Issued Oct. 31, 2001, 4 pages.

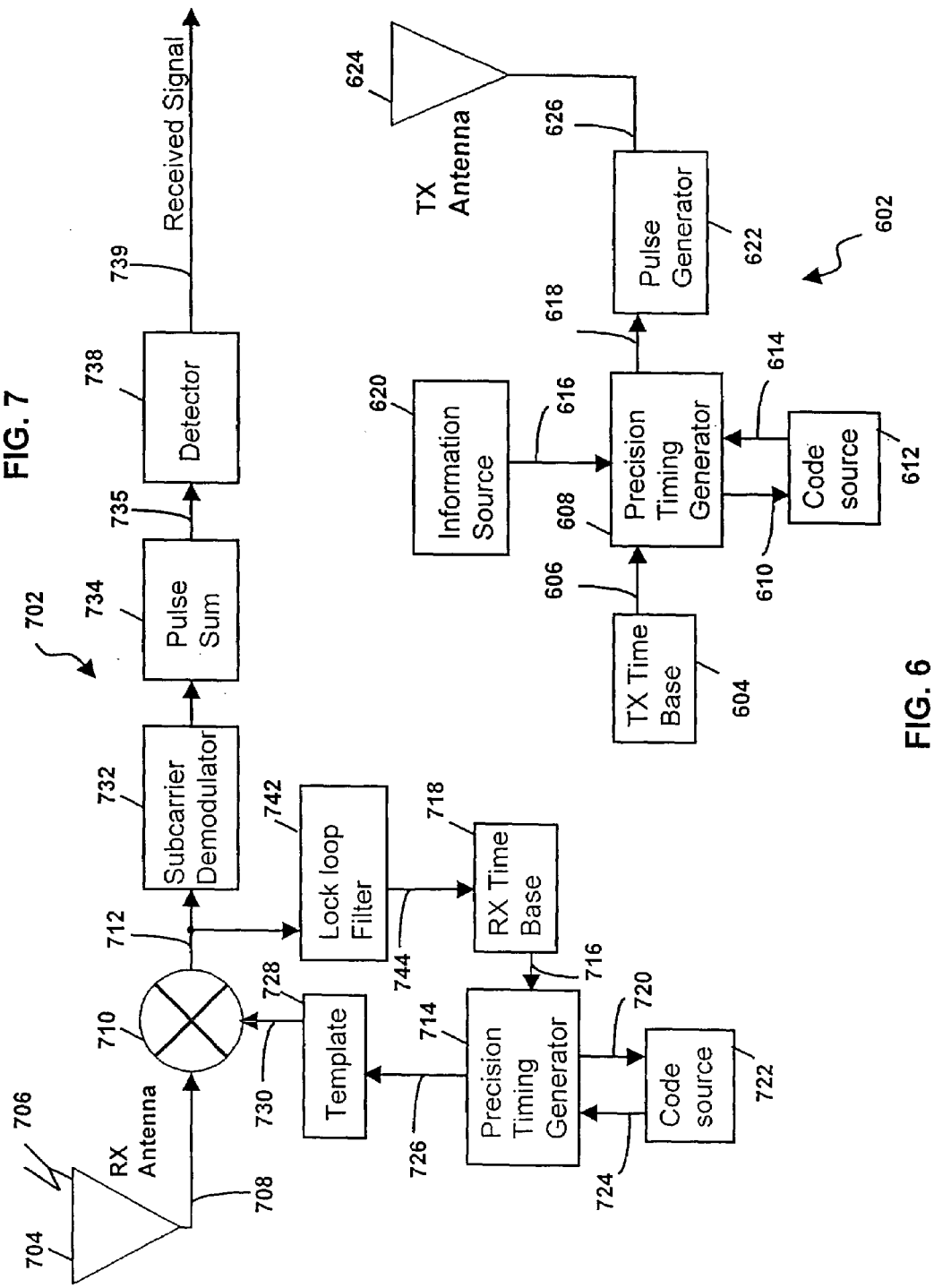

CORRESPONDING
TO EACH
Δt

SYSTEM AND METHOD FOR ESTIMATING SEPARATION DISTANCE BETWEEN IMPULSE RADIOS USING IMPULSE SIGNAL AMPLITUDE

CROSS-REFERENCE TO RELATED APPLICATIONS

This application is a continuation of U.S. Non-Provisional application Ser. No. 09/537,263, filed Mar. 29, 2000, entitled "System and Method for Estimating Separation Distance Between Impulse Radios Using Impulse Signal Amplitude" now U.S. Pat. No. 6,700,538 issued Mar. 2, 2004, which is incorporated herein by reference in its entirety. This application is also related to U.S. Non-Provisional application Ser. No. 09/045,929, filed Mar. 23, 2008, entitled "System and Method for Person or Object Position Location Utilizing Impulse Radio," now U.S. Pat. No. 6,133,876 issued Oct. 17, 2000, and U.S. Non-Provisional application Ser. No. 09/332,501, filed Jun. 14, 1999, entitled "System and Method for Impulse Radio Power Control," now U.S. Pat. No. 6,539,218 issued Mar. 25, 2003, which are incorporated herein by reference in their entireties.

BACKGROUND OF THE INVENTION

1. Field of the Invention

The present invention relates generally to using radio signals to estimate separation distances between transmitting and receiving radios, and more particularly, to a system and method of estimating a separation distance between an impulse radio transmitter and an impulse radio receiver based on a signal strength of an impulse signal at the receiver.

2. Related Art

A known time-based system for estimating a separation distance between a transmitter and a receiver translates a transit time of a radio signal transmitted between the transmitter and the receiver into a separation distance estimate. Such a system disadvantageously requires complex transceiver circuitry and/or techniques for time-synchronizing the receiver to the transmitter, and for measuring signal time-of-arrival at the receiver.

A known amplitude-based system includes a transmitter for transmitting a radio signal, such as a continuous wave signal having a relatively narrow band frequency characteristic, and a receiver for receiving the radio signal and for estimating a separation distance between the transmitter and the receiver based on a signal strength or amplitude measurement of the narrow band signal at the receiver. Although less complex and generally less expensive than the time-based system, the narrow band, amplitude-based system disadvantageously suffers from multipath fading processes. An example of such multipath effects is called Rayleigh fading, in which signals from many delayed reflections combine and destructively interfere with one another at an antenna of the receiver. This is especially true of mobile urban environments and within edifices where multipath effects may be so extreme as to cause 6 decibels (dB) or more root-means-square signal strength deviations with more than 30 dB or more signal strength nulls at the receiver, resulting in thirty-to-one (30:1) distance measurement errors. Such large signal strength fluctuations as a function of receiver position lead to inaccurate separation distance estimates and render known amplitude-based systems unusable. Efforts to overcome multipath fading include diversity techniques such as using multiple frequencies and multiple antennas, as well as using spread spectrum coded waveforms. However, such efforts have had only limited success.

Therefore, there exists a need to resist or mitigate the effects of multipath fading in a system for estimating a separation distance between a mobile radio transmitter and a mobile radio receiver based on a signal strength measurement at the receiver.

SUMMARY OF THE INVENTION

The present invention is directed to a multipath resistant, impulse radio system for estimating a separation distance between an impulse radio transmitter and an impulse radio receiver. The system includes an impulse transmitter for transmitting an impulse signal having one or more of an ultra-wideband or medium wideband frequency characteristic. The ultra-wideband and medium wideband impulse signal advantageously resists multipath fading effects. An impulse receiver spaced from the transmitter receives the transmitted, multipath resistant impulse signal. The receiver includes a signal evaluator configured to measure a signal strength of the received impulse signal. An estimator, coupled to the evaluator, estimates the separation distance based on the measured signal strength. The present invention improves the accuracy of the separation distance estimate over known systems by utilizing multipath resistance afforded by the impulse radio signal. Accordingly, the separation distance estimation accuracy in the present invention is relatively immune to multipath effects compared to narrow band amplitude methods. As a result, the present invention offers performance improvements over narrow band amplitude based methods and a simpler solution compared to timing based methods.

In one embodiment of the present invention, the receiver receives a plurality of impulse signals including impulse signals arising from multipath effects. The receiver classifies a signal propagational/multipath environment using the received impulse signals, and then selects a radio propagation path loss model corresponding to a classified multipath environment. The estimator translates the measured signal strength to a separation distance based on the selected radio propagation path loss model. In doing so, the receiver further improves the accuracy of the separation distance estimate because the estimate takes into account information regarding the propagation environment, which can be deduced from patterns in received multipath impulse signals.

Further features and advantages of the invention, as well as the structure and operation of various embodiments of the invention, are described in detail below with reference to the accompanying drawings.

BRIEF DESCRIPTION OF THE FIGURES

Within the accompanying drawings, the convention used to describe signal connections requires that a signal line end at a junction with another signal line to indicate a connection. Two signal lines that cross indicate no connection at the crossing. Also, like reference numbers generally indicate identical, functionally similar, and/or structurally similar elements. The drawing in which an element first appears is indicated by the leftmost digit(s) in the corresponding reference number. The present invention will now be described with reference to the accompanying drawings, wherein:

FIG. 6 illustrates a representative impulse radio transmitter functional diagram;

FIG. 7 illustrates a representative impulse radio receiver functional diagram not including separation distance estimating capability;

DETAILED DESCRIPTION OF THE PREFERRED EMBODIMENTS

Figure 1B:
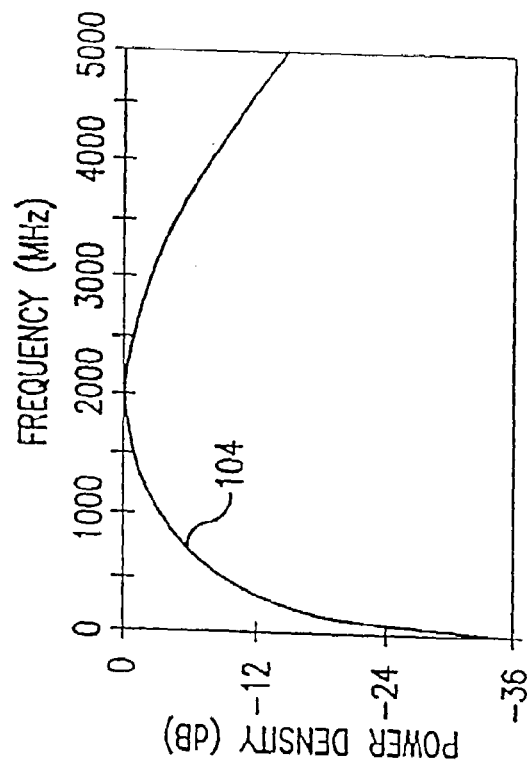
FIG. 1B illustrates the frequency domain amplitude of the Gaussian Monocycle of FIG. 1A.

| Table of Contents | |
|---|---|
| I. | Impulse Radio Basics |
| | I.1. Waveforms |
| | I.2. Pulse Trains |
| | I.3. Coding for Energy Smoothing and Channelization |
| | I.4. Modulation |
| | I.5. Reception and Demodulation |
| | I.6. Interference Resistance |
| | I.7. Processing Gain |
| | I.8. Capacity |
| | I.9. Multipath and Propagation |
| | I.10. Distance Measurement Using Time Measurements |
| II. | Exemplary Transceiver Implementation |
| | II.1. Transmitter |
| | II.2. Receiver |
| III. | Overview of the Invention |
| IV. | Impulse Radio Transceiver |
| | IV.1. Transceiver Overview |
| | IV.2. Receiver Operation |
| | IV.2.a. Signal Detection |
| | IV.2.b. Signal Strength Measurement |
| V. | Determining Separation Distance |
| | V.1. Overview |
| | V.2. Amplitude-Time Multipath Waveform Analysis |
| | V.3. Radio Propagation Path Loss Models |
| | V.4. Detailed Process for Estimating Separation Distance |
| VI. | Exemplary Transceiver Computer System |
| VII. | Exemplary Transceiver Comparator System |
| VIII. | Conclusion |

I. Impulse Radio Basics

This section is directed to technology basics and provides the reader with an introduction to impulse radio concepts, as well as other relevant aspects of communications theory. This section includes subsections relating to waveforms, pulse trains, coding for energy smoothing and channelization, modulation, reception and demodulation, interference resistance, processing gain, capacity, multipath and propagation, distance measurement, and qualitative and quantitative characteristics of these concepts. It should be understood that this section is provided to assist the reader with understanding the present invention, and should not be used to limit the scope of the present invention.

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse radio communications, the pulse-to-pulse interval can be varied on a pulse-by-pulse basis by two components: an information component and a pseudo-random code component. Generally, conventional spread spectrum systems make use of pseudo-random codes to spread the normally narrow band information signal over a relatively wide band of frequencies. A conventional spread spectrum receiver correlates these signals to retrieve the original information signal. Unlike conventional spread spectrum systems, the pseudo-random code for impulse radio communications is not necessary for energy spreading because the monocycle pulses themselves have an inherently wide bandwidth. Instead, the pseudo-random code is used for channelization, energy smoothing in the frequency domain, resistance to interference, and reducing the interference potential to nearby receivers.

The impulse radio receiver is typically a direct conversion receiver with a cross correlator front end in which the front end coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method permits alternating current (AC) coupling of stages, or equivalent signal processing to eliminate direct current (DC) drift and errors from the detection process. This subcarrier technique is described in detail in U.S. Pat. No. 5,677,927 to Fullerton et al.

In impulse radio communications utilizing time shift modulation, each data bit typically time position modulates many pulses of the periodic timing signal. This yields a modulated, coded timing signal that comprises a train of identically shaped pulses for each single data bit. The impulse radio receiver integrates multiple pulses to recover the transmitted information.

I.1. Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra-wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

Where, $\sigma$ is a time scaling parameter, t is time, $f_{mono}(t)$ is the waveform voltage, and e is the natural logarithm base.

Figure 1A:
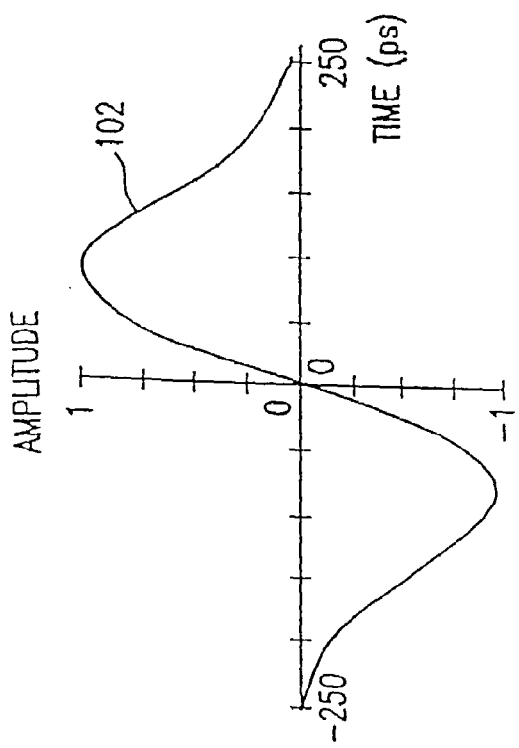
FIG. 1A illustrates a representative Gaussian Monocycle waveform in the time domain.

The frequency domain spectrum of the above waveform is shown in FIG. 1B. The corresponding equation is:

$$F_{mono}(f) = (2\pi)^{\frac{3}{2}} \sigma f e^{-2(\pi\sigma f)^2}$$

The center frequency ($f_c$), or frequency of peak spectral density is:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

I.2. A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Figure 2B:
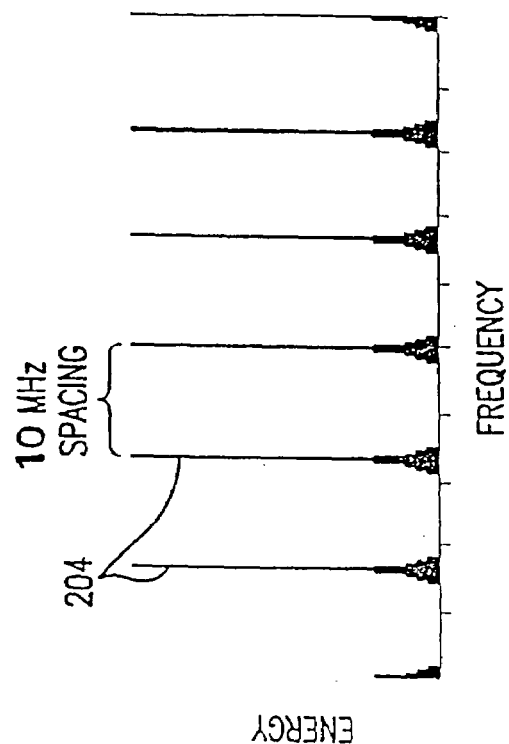
FIG. 2B illustrates the frequency domain amplitude of the waveform of FIG. 2A.
Figure 2A:
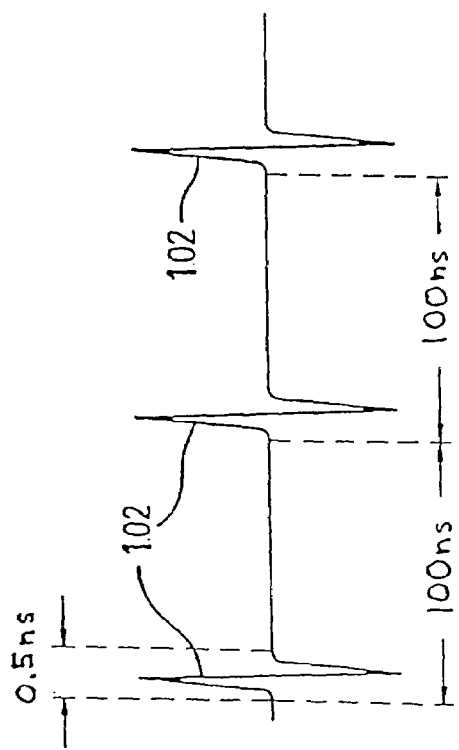
FIG. 2A illustrates a pulse train comprising pulses as in FIG. 1A.

Prototypes built by the inventors have pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows a time domain representation of this sequence of pulses 102. FIG. 2B, which shows 60 MHZ at the center of the spectrum for the waveform of FIG. 2A, illustrates that the result of the pulse train in the frequency domain is to produce a spectrum comprising a set of lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to receiver sharing the band. It may also be observed from FIG. 2A that impulse radio systems typically have very low average duty cycles resulting in average power significantly lower than peak power. The duty cycle of the signal in the present example is 0.5%, based on a 0.5 ns pulse in a 100 ns interval.

I.3. Coding for Energy Smoothing and Channelization

For high pulse rate systems, it may be necessary to more finely spread the spectrum than is achieved by producing comb lines. This may be done by pseudo-randomly positioning each pulse relative to its nominal position.

Figure 3:
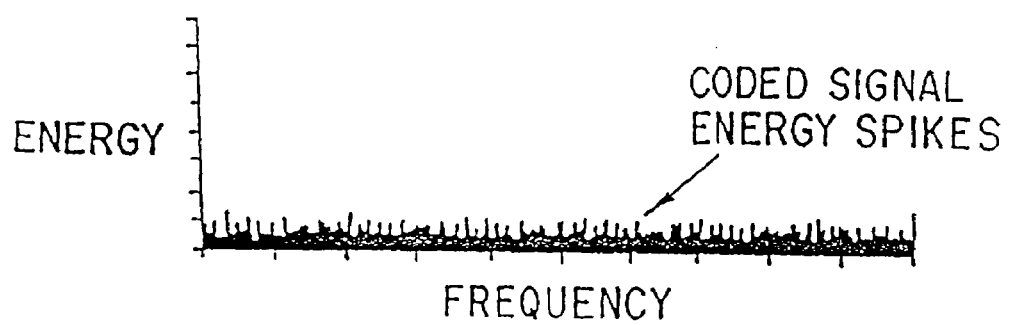
FIG. 3 illustrates the frequency domain amplitude of a sequence of time coded pulses.

FIG. 3 is a plot illustrating the impact of a pseudo-noise (PN) code dither on energy distribution in the frequency domain (A pseudo-noise, or PN code is a set of time positions defining the pseudo-random positioning for each pulse in a sequence of pulses). FIG. 3, when compared to FIG. 2B, shows that the impact of using a PN code is to destroy the comb line structure and spread the energy more uniformly. This structure typically has slight variations which are characteristic of the specific code used.

The PN code also provides a method of establishing independent communication channels using impulse radio. PN codes can be designed to have low cross correlation such that a pulse train using one code will seldom collide on more than one or two pulse positions with a pulses train using another code during any one data bit time. Since a data bit may comprise hundreds of pulses, this represents a substantial attenuation of the unwanted channel.

I.4. Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to PN code dither) in response to the information signal. This amount is typically very small relative to the PN code shift. In a 10 Mpps system with a center frequency of 2 GHz., for example, the PN code may command pulse position variations over a range of 100 ns; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Modulation further smooths the spectrum, minimizing structure in the resulting spectrum.

I.5. Reception and Demodulation

Clearly, if there were a large number of impulse radio users within a confined area, there might be mutual interference. Further, while the PN coding minimizes that interference, as the number of users rises, the probability of an individual pulse from one user's sequence being received simultaneously with a pulse from another user's sequence increases. Impulse radios are able to perform in these environments, in part, because they do not depend on receiving every pulse. The impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

I.6. Interference Resistance

Besides channelization and energy smoothing, the PN coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The PN code helps impulse systems discriminate between the intended impulse transmission and interfering transmissions from others.

Figure 4:
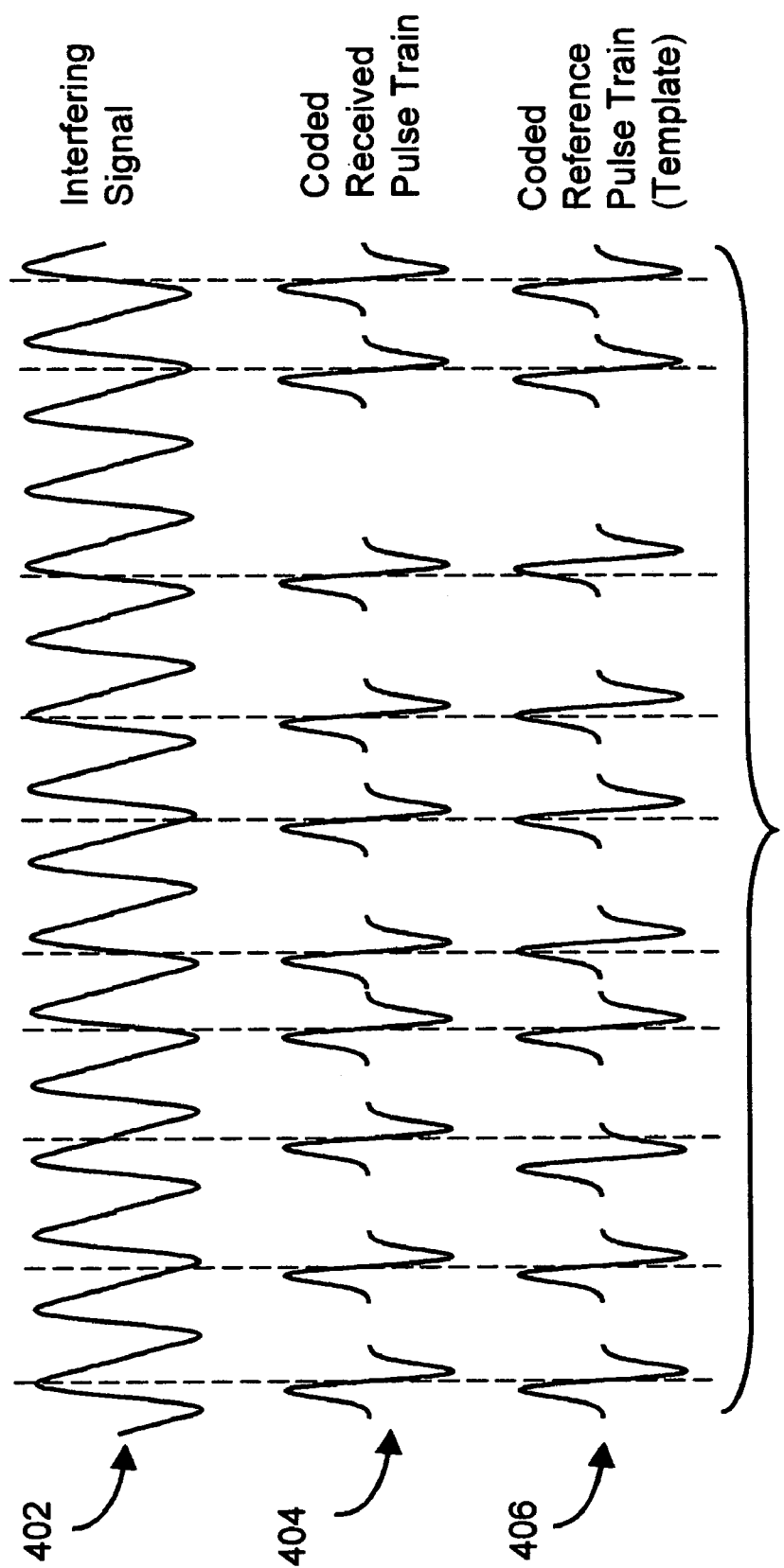
FIG. 4 illustrates a typical received signal and interference signal.

FIG. 4 illustrates the result of a narrow band sinusoidal interference signal 402 overlaying an impulse radio signal 404. At the impulse radio receiver, the input to the cross correlation would include the narrow band signal 402, as well as the received ultrawide-band impulse radio signal 404. The input is sampled by the cross correlator with a PN dithered template signal 406. Without PN coding, the cross correlation would sample the interfering signal 402 with such regularity that the interfering signals could cause significant interference to the impulse radio receiver. However, when the transmitted impulse signal is encoded with the PN code dither (and the impulse radio receiver template signal 406 is synchronized with that identical PN code dither) the correlation samples the interfering signals pseudo-randomly. The samples from the interfering signal add incoherently, increasing roughly according to square root of the number of samples integrated; whereas, the impulse radio samples add coherently, increasing directly according to the number of samples integrated. Thus, integrating over many pulses overcomes the impact of interference.

I.7. Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 kHz information bandwidth and a 10 MHZ channel bandwidth yields a processing gain of 1000 or 30 dB. However, far greater processing gains are achieved with impulse radio systems, where for the same 10 KHz information bandwidth is spread across a much greater 2 GHz channel bandwidth, the theoretical processing gain is 200,000 or 53 dB.

I.8. Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users may be described by the following equation:

$$V_{tot}^2 = \frac{N\sigma^2}{\sqrt{Z}}$$

Where $V_{tot}^2$ is the total interference signal to noise ratio variance, at the receiver;

N is the number of interfering users;

$\sigma^2$ is the signal to noise ratio variance resulting from one of the interfering signals with a single pulse cross correlation; and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

I.9. Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their seemingly random relative phases. This results in possible summation or possible cancellation, depending on the specific propagation to a given location. This situation occurs where the direct path signal is weak relative to the multipath signals, which represents a major portion of the potential coverage of a radio system. In mobile systems, this results in wild signal strength fluctuations as a function of distance traveled, where the changing mix of multipath signals results in signal strength fluctuations for every few feet of travel.

Figure 5A:
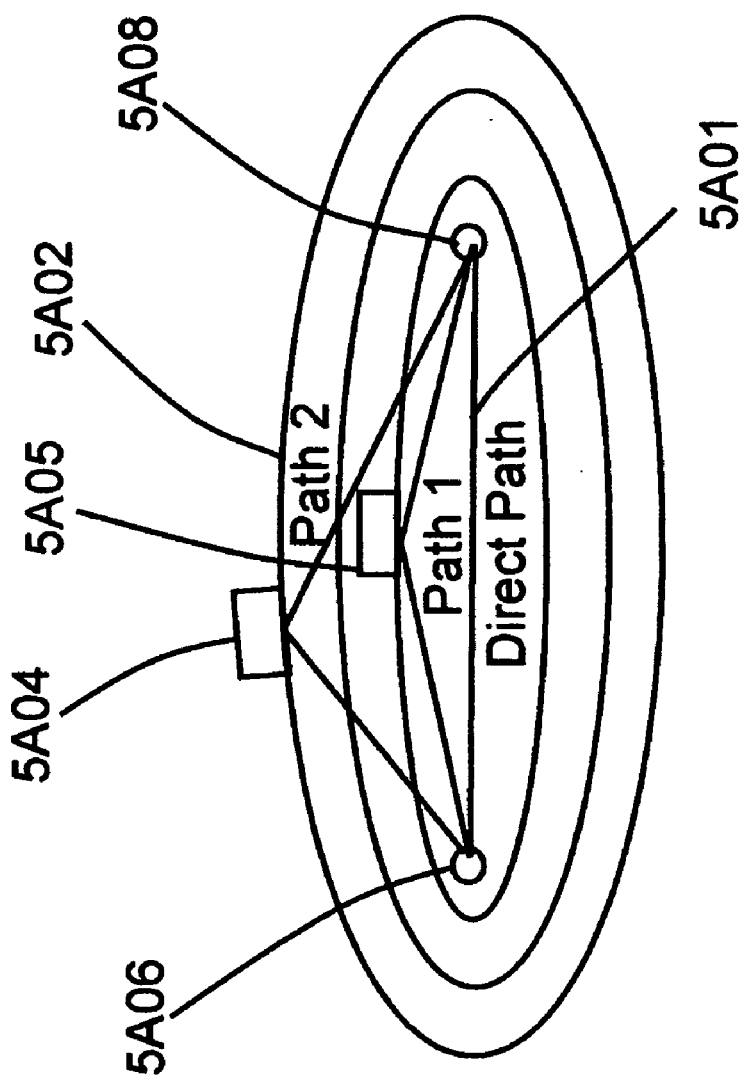
FIG. 5A illustrates a typical geometrical configuration giving rise to multipath received signals.

Impulse radios, however, can be substantially resistant to these effects. Impulses arriving from delayed multipath reflections typically arrive outside of the correlation time and thus can be ignored. This process is described in detail with reference to FIGS. 5A and 5B. In FIG. 5A, three propagation paths are shown. The direct path representing the straight line distance between the transmitter and receiver is the shortest. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

Figure 5B:
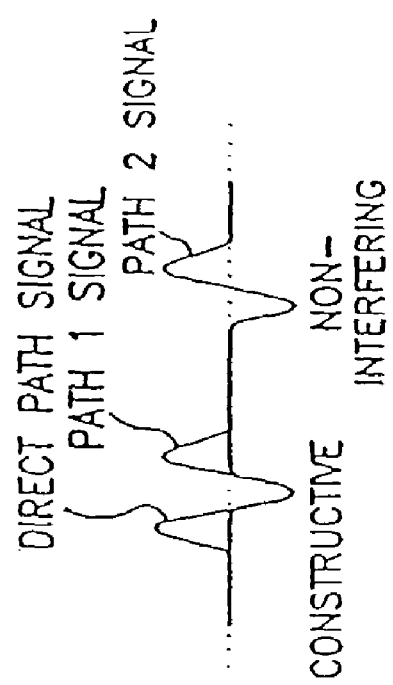
FIG. 5B illustrates exemplary multipath signals in the time domain.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect on the reception of the direct path signal. The multipath signals delayed less than one quarter wave (one quarter wave is about 1.5 inches, or 3.5 cm at 2 GHz center frequency) are the only multipath signals that can attenuate the direct path signal. This region is equivalent to the first Fresnel zone familiar to narrow band systems designers. Impulse radio, however, has no further nulls in the higher Fresnel zones. The ability to avoid the highly variable attenuation from multipath gives impulse radio significant performance advantages.

FIG. 5A illustrates a typical multipath situation, such as in a building, where there are many reflectors 5A04, 5A05 and multiple propagation paths 5A02, 5A01. In this figure, a transmitter TX 5A06 transmits a signal which propagates along the multiple propagation paths 5A02, 5A04 to receiver RX 5A08, where the multiple reflected signals are combined at the antenna.

FIG. 5B illustrates a resulting typical received composite pulse waveform resulting from the multiple reflections and multiple propagation paths 5A01, 5A02. In this figure, the direct path signal 5A01 is shown as the first pulse signal received. The multiple reflected signals ("multipath signals", or "multipath") comprise the remaining response as illustrated.

Figure 5C:
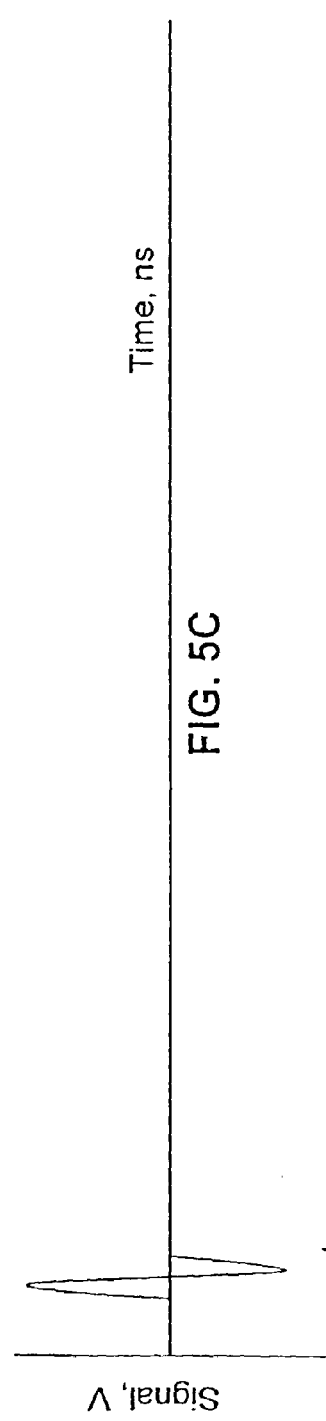
FIGS. 5C–5E illustrate a signal plot of various multipath environments.
Figure 5D:
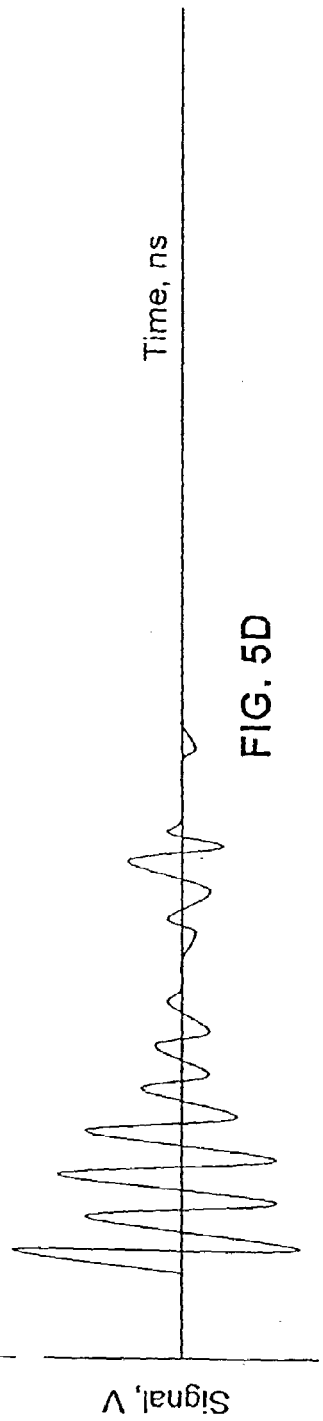
Figure 5E:
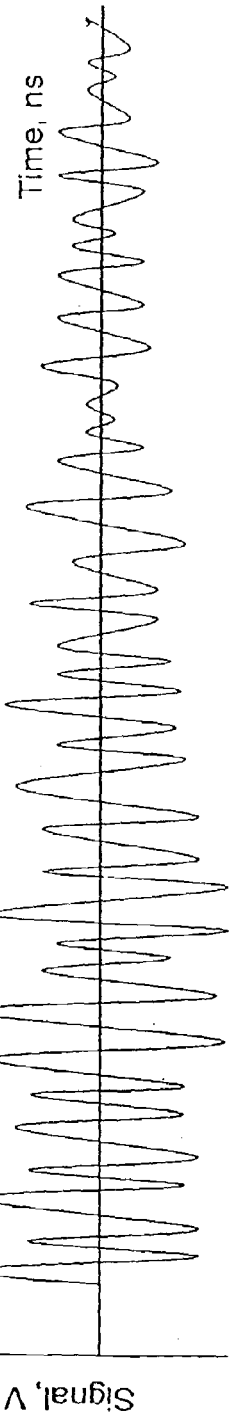

FIGS. 5C, 5D, and 5E represent the received signal from a TM-UWB transmitter in three different multipath environments. These figures are not actual signal plots, but are hand drawn plots approximating typical signal plots. FIG. 5C illustrates the received signal in a very low multipath environment. This may occur in a building where the receiver antenna is in the middle of a room and is one meter from the transmitter. This may also represent signals received from some distance, such as 100 meters, in an open field where there are no objects to produce reflections. In this situation, the predominant pulse is the first received pulse and the multipath reflections are too weak to be significant. FIG. 5D illustrates an intermediate multipath environment. This approximates the response from one room to the next in a building. The amplitude of the direct path signal is less than in FIG. 5C and several reflected signals are of significant amplitude. (Note that the scale has been increased to normalize the plot.) FIG. 5E approximates the response in a severe multipath environment such as: propagation through many rooms; from corner to corner in a building; within a metal cargo hold of a ship; within a metal truck trailer; or within an intermodal shipping container. In this scenario, the main path signal is weaker than in FIG. 5D. (Note that the scale has been increased again to normalize the plot.) In this situation, the direct path signal power is small relative to the total signal power from the reflections.

An impulse radio receiver in accordance with the present invention can receive the signal and demodulate the information using either the direct path signal or any multipath signal peak having sufficient signal to noise ratio. Thus, the impulse radio receiver can select the strongest response from among the many arriving signals. In order for the signals to cancel and produce a null at a given location, dozens of reflections would have to be canceled simultaneously and precisely while blocking the direct path—a highly unlikely scenario. This time separation of multipath signals together with time resolution and selection by the receiver permit a type of time diversity that virtually eliminates cancellation of the signal. In a multiple correlator rake receiver, performance is further improved by collecting the signal power from multiple signal peaks for additional signal to noise performance.

Where the system of FIG. 5A is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{1}{\sigma^2} \exp\left(\frac{-r^2}{2\sigma^2}\right)$$

where r is the envelope amplitude of the combined multipath signals, and $2\sigma^2$ is the RMS power of the combined multipath signals.

Figure 5F:
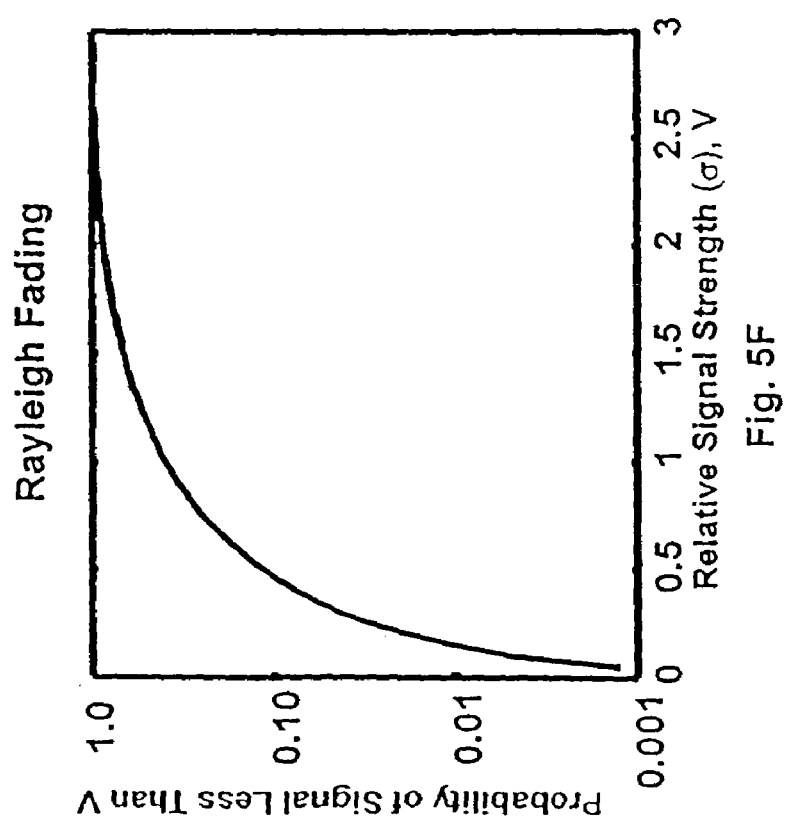
FIG. 5F illustrates the Rayleigh fading curve associated with non-impulse radio transmissions in a multipath environment.

This distribution shown in FIG. 5F. It can be seen in FIG. 5F that 10% of the time, the signal is more than 16 dB attenuated. This suggests that 16 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

Figure 5G:
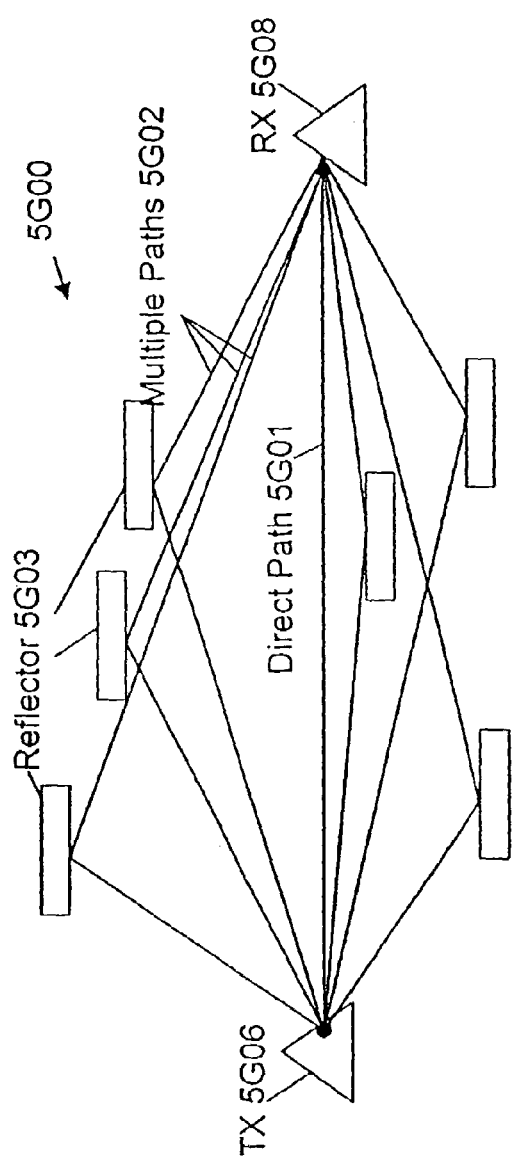
FIG. 5G illustrates a plurality of multipaths with a plurality of reflectors from a transmitter to a receiver.
Figure 5H:
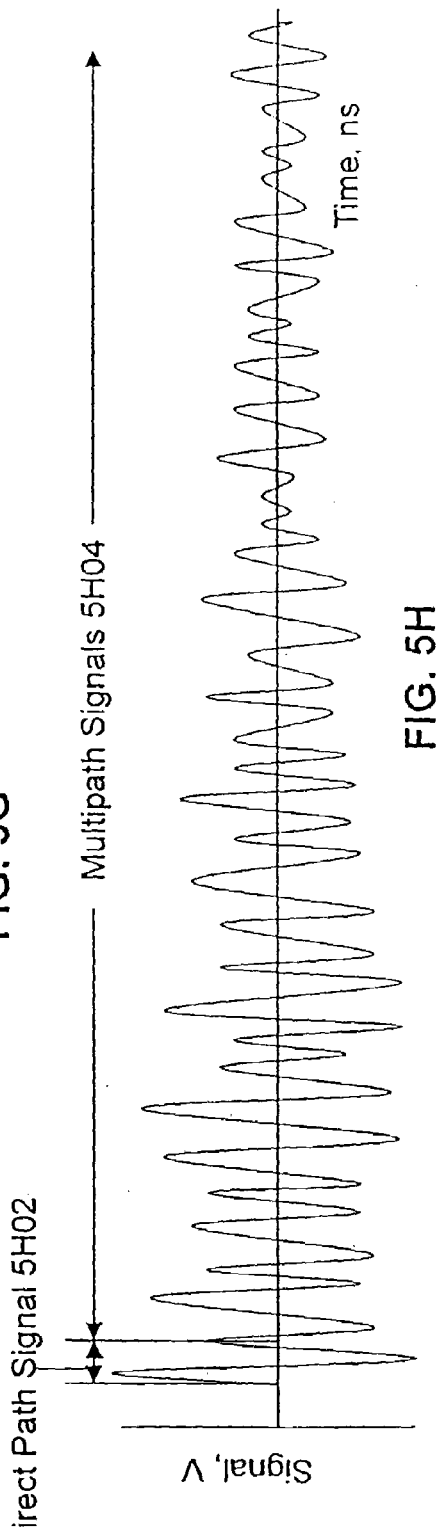
FIG. 5H graphically represents signal strength as volts vs. time in a direct path and multipath environment.

In a high multipath environment such as inside homes, offices, warehouses, automobiles, trailers, shipping containers, or outside in the urban canyon or other situations where the propagation is such that the received signal is primarily scattered energy, impulse radio, according to the present invention, can avoid the Rayleigh fading mechanism that limits performance of narrow band systems. This is illustrated in FIGS. 5G and 5H in a transmit and receive system in a high multipath environment 5G00, wherein the transmitter 5G06 transmits to receiver 5G08 with the signals reflecting off reflectors 5G03 which form multipaths 5G02. The direct path is illustrated as 5G01 with the signal graphically illustrated at 5H02, with the vertical axis being the signal strength in volts and horizontal axis representing time in nanoseconds. Multipath signals are graphically illustrated at 5H04.

I.10. Distance Measurement Using Timing Resolution

Impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength-potentially, down to the noise floor of the system. This time position measurement may be used to measure propagation delay to determine link distance, and once link distance is known, to transfer a time reference to an equivalently high degree of precision. The inventors of the present invention have built systems that have shown the potential for centimeter distance resolution, which is equivalent to about 30 ps of time transfer resolution.

II. Exemplary Transceiver Implementation

II.1. Transmitter

An exemplary embodiment of an impulse radio transmitter 602 of an impulse radio communication system having one subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618.

The code source 612 comprises a storage device such as a random access memory (RAM), read only memory (ROM), or the like, for storing suitable PN codes and for outputting the PN codes as a code signal 614. Alternatively, maximum length shift registers or other computational means can be used to generate the PN codes.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultrawide-band, approaching a monocycle pulse as in FIG. 1A. However, the emitted signal can be spectrally modified by filtering of the pulses. This filtering will usually cause each monocycle pulse to have more zero crossings (more cycles) in the time domain. In this case, the impulse radio receiver can use a similar waveform as the template signal in the cross correlator for efficient conversion.

The teachings of the present invention can be combined with the vector modulation scheme disclosed in commonly owned and concurrently filed U.S. patent application Ser. No. 09/538,519,entitled "[System and Method for Impulse Radio Vector Modulation]Vector Modulation System and Method for Wideband Impulse Radio Communications, now U.S. Pat. No. 6,763,057, issued Jul. 13, 2004, which is incorporated herein by reference in its entirety. For example, in vector modulation, each pulse is modulated into one of a plurality of different time positions spanning a cycle of a pulse interval. Using the teachings of the present invention, each vector modulated (i.e., time positioned) pulse can be one of two types of pulses (i.e., a first type of pulse, and a second type of pulse that is substantially the inverse of the first type of pulse). In another example, each vector modulated pulse can be one of four types of pulses (i.e., a first type of pulse, a delayed first type of pulse, a second type of pulse that is substantially the inverse of the first type of pulse, and a delayed second type of pulse that is substantially the inverse of the delayed first type of pulse). The result is that additional data states, and thus faster data speeds, can be realized through such a combination of modulation schemes.

II.2. Receiver

An exemplary embodiment of an impulse radio receiver 702 (hereinafter called the receiver) for the impulse radio communication system is now described with reference to FIG. 7. More specifically, the system illustrated in FIG. 7 is for reception of digital data wherein one or more pulses are transmitted for each data bit.

The receiver 702 comprises a receive antenna 704 for receiving a propagated impulse radio signal 706. A received signal 708 from the receive antenna 704 is coupled to a cross correlator or sampler 710 to produce a baseband output 712. The cross correlator or sampler 710 includes multiply and integrate functions together with any necessary filters to optimize signal to noise ratio.

The receiver 702 also includes a precision timing generator 714, which receives a periodic timing signal 716 from a receiver time base 718. This time base 718 is adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter 602 to generate the propagated signal 706. Thus, the timing of the template pulse train 730 matches the timing of the received signal pulse train 708, allowing the received signal 708 to be synchronously sampled in the correlator 710. The correlator 710 ideally comprises a multiplier followed by a short term integrator to sum the multiplier product over the pulse interval. Further examples and details of correlation and sampling processes can be found in commonly owned U.S. Pat. Nos. 4,641,317, 4,743,906, 4,813,057, and 4,979,186, which are incorporated herein by reference, and commonly owned and copending application Ser. No. 09/356,384, filed Jul. 16, 1999, titled: "Baseband Signal Converter Device for a Wideband Impulse Radio Receiver," which is incorporated herein by reference.

The impulse radio receivers of the present invention lock onto and acquire impulse radio signals. In one embodiment, this can be accomplished by comparing a template pulse train with a received impulse radio signal to obtain a comparison result, performing a threshold check of the comparison result, and locking on the received impulse radio signal if the comparison result passes the threshold check. Additionally, a quick check using the template pulse train and an additional received impulse radio signal can be performed. Further, a synchronization check of a further received impulse radio signal can be performed. Moreover, a command check of command data of the impulse radio signal can be performed. Additional details of systems and methods for fast locking and acquiring impulse radio signals are disclosed in commonly owned and concurrently filed U.S. patent application Ser. No. 09/538,292, entitled "System for Fast Lock and Acquisition of Ultra-Wideband Signals," now U.S. Pat. No. 6,556,621 issued Apr. 29, 2003," which is incorporated herein by reference in its entirety.

The output of the correlator 710, also called a baseband signal 712, is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator 732 is then filtered or integrated in a pulse summation stage 734. The pulse summation stage produces an output representative of the sum of a number of pulse signals comprising a single data bit. The output of the pulse summation stage 734 is then compared with a nominal zero (or reference) signal output in a detector stage 738 to determine an output signal 739 representing an estimate of the original information signal 616.

The baseband signal 712 is also input to a lowpass filter 742 (also referred to as lock loop filter 742). A control loop comprising the lowpass filter 742, time base 718, precision timing generator 714, template generator 728, and correlator 710 is used to generate a filtered error signal 744. The filtered error signal 744 provides adjustments to the adjustable time base 718 to time position the periodic timing signal 726 in relation to the position of the received signal 708. In a transceiver embodiment, substantial economy can be achieved by sharing part or all of several of the functions of the transmitter 602 and receiver 702. Some of these include the time base 718, precision timing generator 714, code source 722, antenna 704, and the like.

Figure 8A:
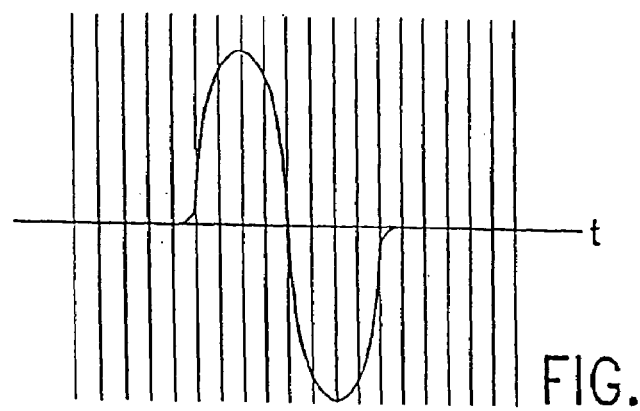
FIG. 8A illustrates a representative received pulse signal at the input to the correlator.
Figure 8B:
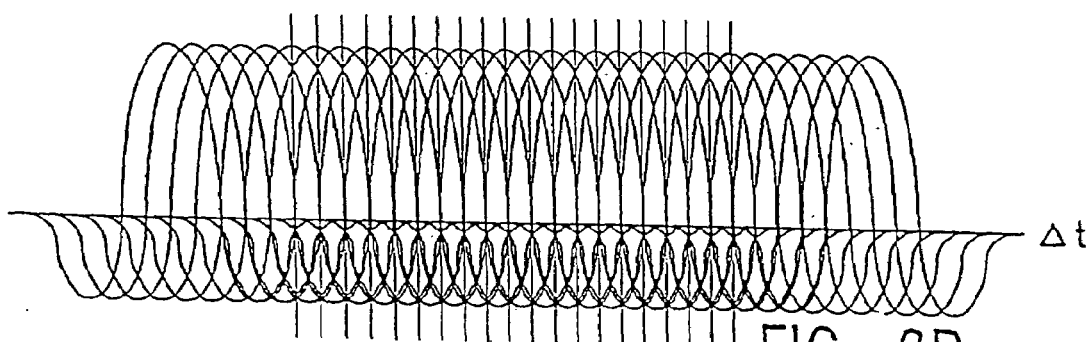
FIG. 8B illustrates a sequence of representative impulse signals in the correlation process.
Figure 8C:
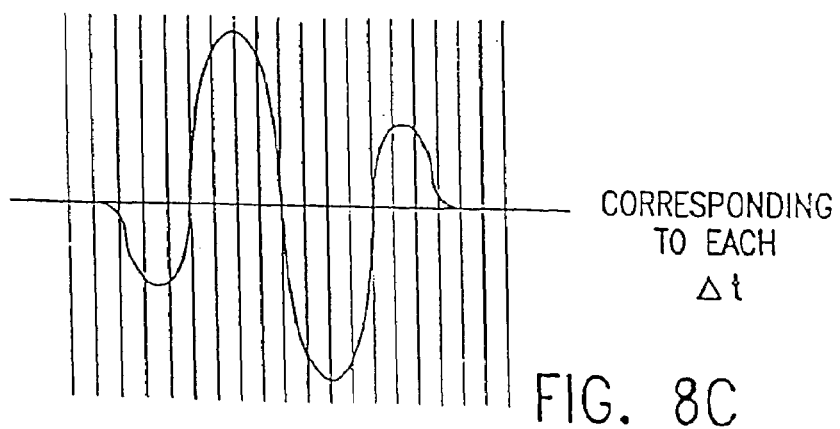
FIG. 8C illustrates the potential locus of results as a function of the various potential template time positions.

FIGS. 8A–8C illustrate the cross correlation process and the correlation function. FIG. 8A shows the waveform of a template signal. FIG. 8B shows the waveform of a received impulse radio signal at a set of several possible time offsets. FIG. 8C represents the output of the correlator (multiplier and short time integrator) for each of the time offsets of FIG. 8B. Thus, this graph, FIG. 8C, does not show a waveform that is a function of time, but rather a function of time-offset, i.e., for any given pulse received, there is only one corresponding point which is applicable on this graph. This is the point corresponding to the time offset of the template signal used to receive that pulse.

Further examples and details of subcarrier processes and precision timing can be found described in U.S. Pat. No. 5,677,927, titled "An Ultrawide-Band Communications System and Method", and commonly owned co-pending application Ser. No. 09/146,524, filed Sep. 3, 1998, titled "Precision Timing Generator System and Method", both of which are incorporated herein by reference.

III. Overview of the Invention

Figure 9:
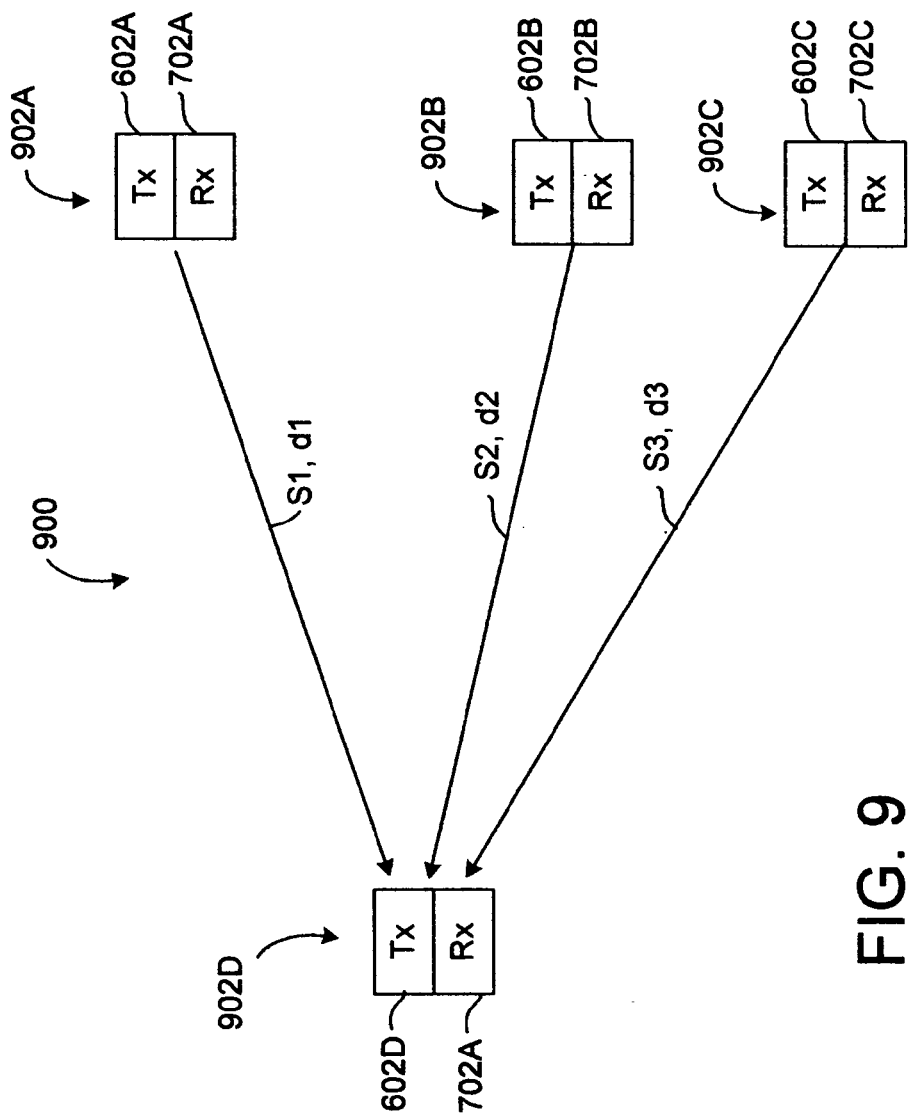
FIG. 9 illustrates an example environment of an impulse radio communication system including a plurality of impulse transceivers, according to the present invention.

The present invention is directed to a system and method for estimating a separation distance between an impulse radio transmitter and an impulse radio receiver based on a received impulse signal strength measured at the impulse radio receiver. An example communications environment 900 within which the present invention operates, is depicted in FIG. 9. In exemplary environment 900, each of a plurality of impulse radio transceivers 902A, 902B and 902C communicates with an impulse radio transceiver 902D. Transceiver 902D is separated from each of transceivers 902A–902C by respective distances d1, d2 and d3. Each of transceivers 902–902D includes an impulse radio receiver 702 and an impulse radio transmitter 602 described previously. Transmitters 602A, 602B and 602C respectively transmit signals S1, S2 and S3 to receiver 602D. Impulse radio transceiver 902D estimates each separation distance d1, d2 or d3 according to the present invention based on a respective signal strength or amplitude of each signal S1, S2 or S3 measured at transceiver 902D by receiver 602D.

For the sake of clarity, only signals S1–S3 are depicted in FIG. 9. However, it is to be understood that full duplex communication can occur between each radio 902A–902D and each other radio 902A–902D such that each radio can determine a separation distance between itself and each of the other radios according to the present invention. Full duplex techniques for impulse radio are disclosed in commonly owned U.S. Pat. No. 5,687,169 (to Fullerton, issued Nov. 11, 1997), which is incorporated by reference herein. Those skilled in the art will also appreciated that transceiver 902 can represent any transceiver employing impulse radio technology (for examples, see U.S. Pat. No. 5,677,927, incorporated by reference above). Transceiver 902 can be a hand-held unit, including a hand-held telephone, or can be affixed in some fashion to a mobile user. Alternatively, transceiver 902 can be fixedly mounted to a base station, for example, so as to be stationary. In an exemplary personnel locating environment, each radio 902A–902D is carried by or affixed to a person. In an alternative arrangement of environment 900, impulse radios 902A, 902B and 902C are radio frequency tags, and therefore include respective transmitters 602A, 602B, and 602C, but no receivers. In yet another embodiment, radio 902D could include a receiver 602D, but no transmitter. Such an arrangement simplifies the circuitry in each of the radios 902A–902D to advantageously reduce the size, weight and cost of the radios.

Reduced radio size and weight are especially advantageous in personnel locator applications where the radios are carried by or affixed to individuals. Other various permutations are envisioned, as would be apparent to a person skilled in the relevant art.

IV. Impulse Radio Transceiver

IV.1. Transceiver Overview.

Figure 10:
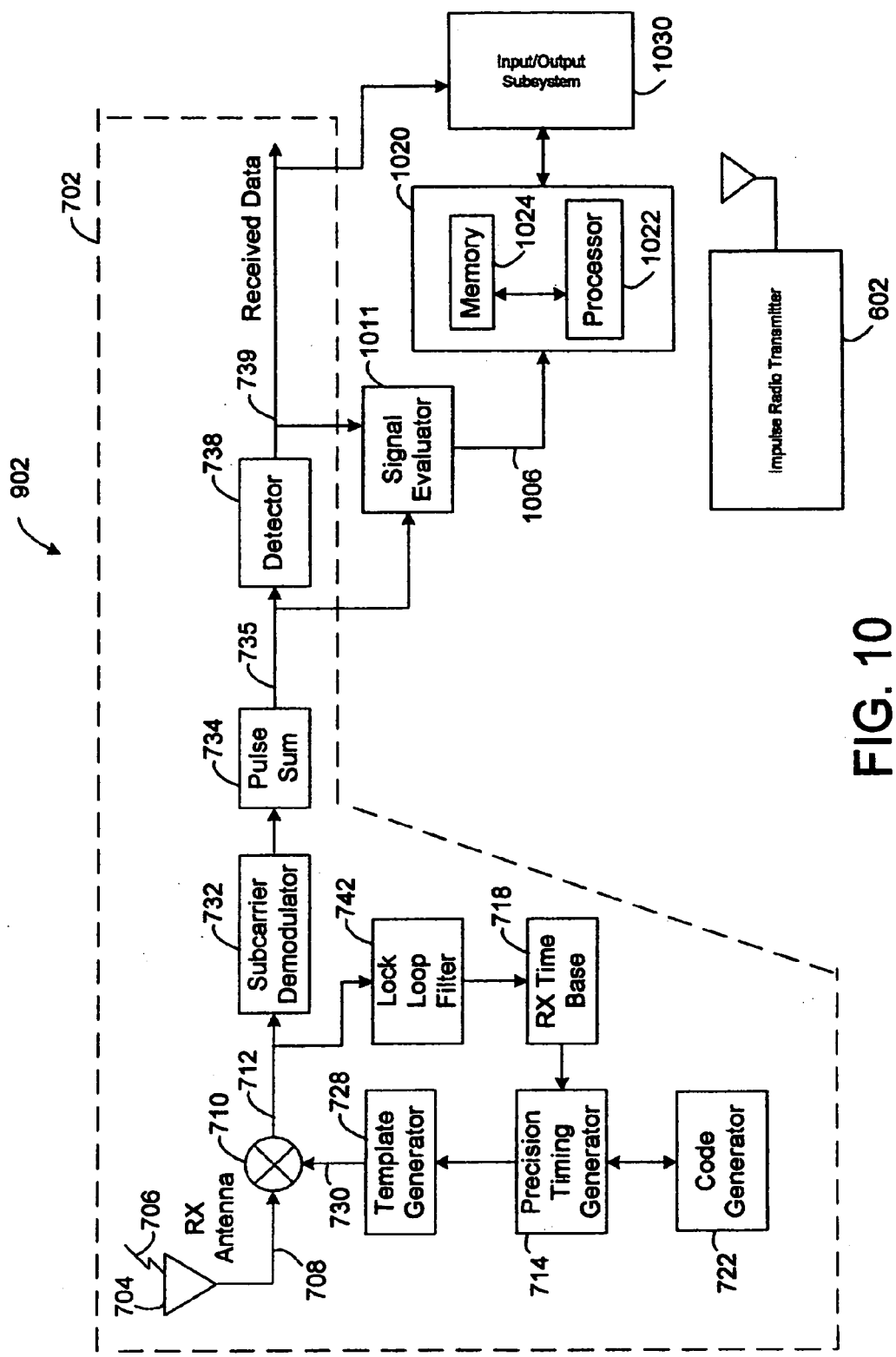
FIG. 10 is an exemplary diagram of an impulse transceiver including a signal evaluator for measuring signal strength and a computer processor for estimating separation distance, according to one embodiment of the present invention.

An impulse radio transceiver 902 (for example, transceiver 902D in FIG. 9) according to an embodiment of the present invention, is depicted in FIG. 10. Transceiver 902 includes a transmitter 602 and a receiver 702 as described previously in connection with respective FIGS. 6 and 7. However, receiver 702 is modified to include a signal evaluator 1011, coupled to receiver 702, for measuring a signal strength or amplitude of an impulse signal (for example, impulse signal S1 in FIG. 9) received by receiver 702 from a distant, originating impulse radio transmitter (for example, transmitter 602A in FIG. 9). Thus, transceiver 902 also includes a processor subsystem 1020 coupled to signal evaluator 1011 for estimating a separation distance between transceiver 902 and the originating transmitter based on the signal strength measured by signal evaluator 1011. Processor subsystem 1020 includes a processor or controller 1022 and a memory 1024 coupled with the processor via a bus, as is known in the art. An input/output (I/O) subsystem 1030 coupled to processor subsystem 1020 includes a user input device, such an alphanumeric keypad, that allows a user to input control commands and the like into transceiver 902. I/O subsystem 1030 also includes output devices, such as a display and/or audio speaker, to provide necessary indicators to the user. I/O subsystem 1030 thus permits the user to interact with and control transceiver 902.

It is to be understood that one or more of the receiver signal processing functions corresponding to receiver blocks or elements 722, 714, 718, 728, 742, 732–738, and 1011 can be implemented by processor or controller 1020. Also, processor 1020 can include a microcontroller, a general microprocessor, a digital signal processor, an Application Specific Integrated Circuit (ASIC), or a combination of such platforms.

It would be apparent to a person skilled in the relevant art that, where some of the diagrams and description may seem to describe a digital implementation, both a digital or an analog implementation are intended. Indeed, an analog implementation can include such analog components as switches, filters, comparators, amplifiers and gain constants, oscillators, and the like, to perform signal processing and computational functions, as necessary.

IV.2. Receiver Operation

The operation of receiver 902 and signal evaluator 1011 are now described. An originating transmitter transmits the RF signal 706 (for example, signal S1 in FIG. 9), which is received by the antenna 704. The resulting received signal 708 is then provided to the correlator 710 where it is multiplied by the template signal 730 and then short term integrated (or alternatively sampled) to produce a baseband output 712. This baseband output is provided to the optional subcarrier demodulator 732, which demodulates a subcarrier as applied to the transmitted signal 706. This output is then long term integrated in the pulse summation stage 734, which is typically an integrate and dump stage that produces a ramp shape output waveform when the receiver 702 is receiving a transmitted signal 706, or is typically a random walk type waveform when receiving pure noise. This output 735 is fed to a detector 738 having an output 739, which represents the detection of the logic state of the transmitted signal 706.

The output of the correlator 710 is also coupled to a lock loop comprising a lock loop filter 742, an adjustable time base 718, a precision timing generator 714, a template generator 728, and the correlator 710. The lock loop maintains a stable quiescent operating point on the correlation function in the presence of variations in the transmitter time base frequency and variations due to Doppler effects.

The adjustable time base 718 drives the precision timing generator 714, which provides timing to the code generator 722, which in turn, provides timing commands back to the precision timing generator 714 according to the selected code. The precision timing generator 714 then provides timing signals to the template generator 728 according to the timing commands, and the template generator 728 generates the proper template waveform 730 for the correlation process. Further examples and discussion of these processes may be found in the patents incorporated by reference above.

It is noted that both coding and subcarrier techniques are optional. Accordingly, it should be appreciated that the present invention covers non-coded implementations that do not incorporate code source 722, and non-subcarrier implementations that do not incorporate subcarrier demodulator 732, as well as subcombinations of these elements.

Still with reference to FIG. 10, the output signal 735 of the pulse summation stage 734 is provided to an input of signal evaluator 1011, which processes the output signal 735 to determine a measure of the signal strength or amplitude 1006. Signal strength 1006 is passed to processor subsystem 1020. Processor subsystem 1020 performs signal processing using signal strength 1006 to estimate a separation distance between the originating transmitter and transceiver 902.

IV.2.a. Signal Detection

Figure 11:
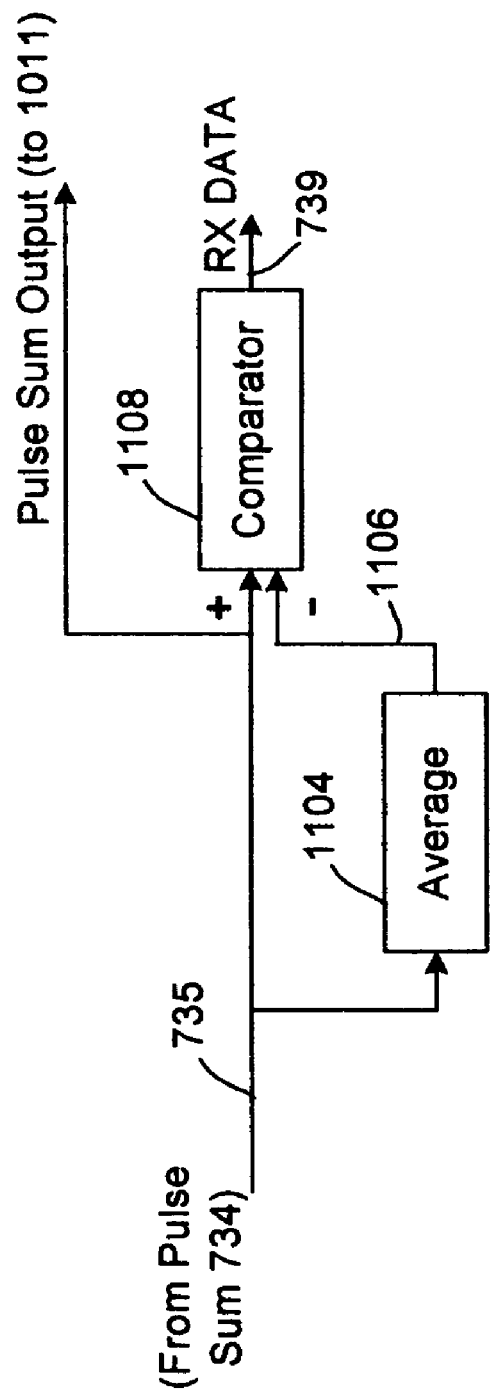
FIG. 11 is a detailed representation of one embodiment of the signal detection process of FIG. 10.

A detailed representation of an embodiment of the signal detection process effected using output signal 735 from pulse sum stage 734 and detector 738 is depicted in FIG. 11. With reference to FIG. 11, the output signal 735 of the pulse summation stage 734 is provided to the input of an averaging function 1104 and a comparator 1108. The averaging function 1104 determines an average value 1106 of the signal 735. This average function 1104 may be a running average, a single pole low pass filter, a simple RC filter (a filter including a resistor(s) and capacitor(s)), or any number of equivalent averaging functions as would be apparent to a person skilled in the relevant art. The average value 1106 represents the DC (direct current) value of the output signal 735 and is used as a reference for comparator 1108 in determining the digital value of the instant signal which is output as received (Rx) data 739. Averaging function 1104 advantageously eliminates DC offsets caused by circuits leading up to comparator 1108. This function, however, depends on a relatively equal number of ones and zeroes in the data stream. An alternative method is to evaluate the average only when no signal is in lock, as evidenced by low signal strength, and then to hold this value when a signal is in lock. This depends on the assumption that the DC offset will be stable over the period of the transmission. A further alternative is to use a low offset circuit such that a fixed value, e.g. zero, may be substituted for the average. This is potentially more expensive, but has no signal dependencies. Yet another alternative is to split the difference between the average voltage detected as a data "one" and the average voltage detected as a data "zero" to determine a reference value for bit comparison. This difference is available from a signal strength measurement process, which is now described in greater detail in the discussion of FIG. 12.

IV.2.b. Signal Strength Measurement

Figure 12:
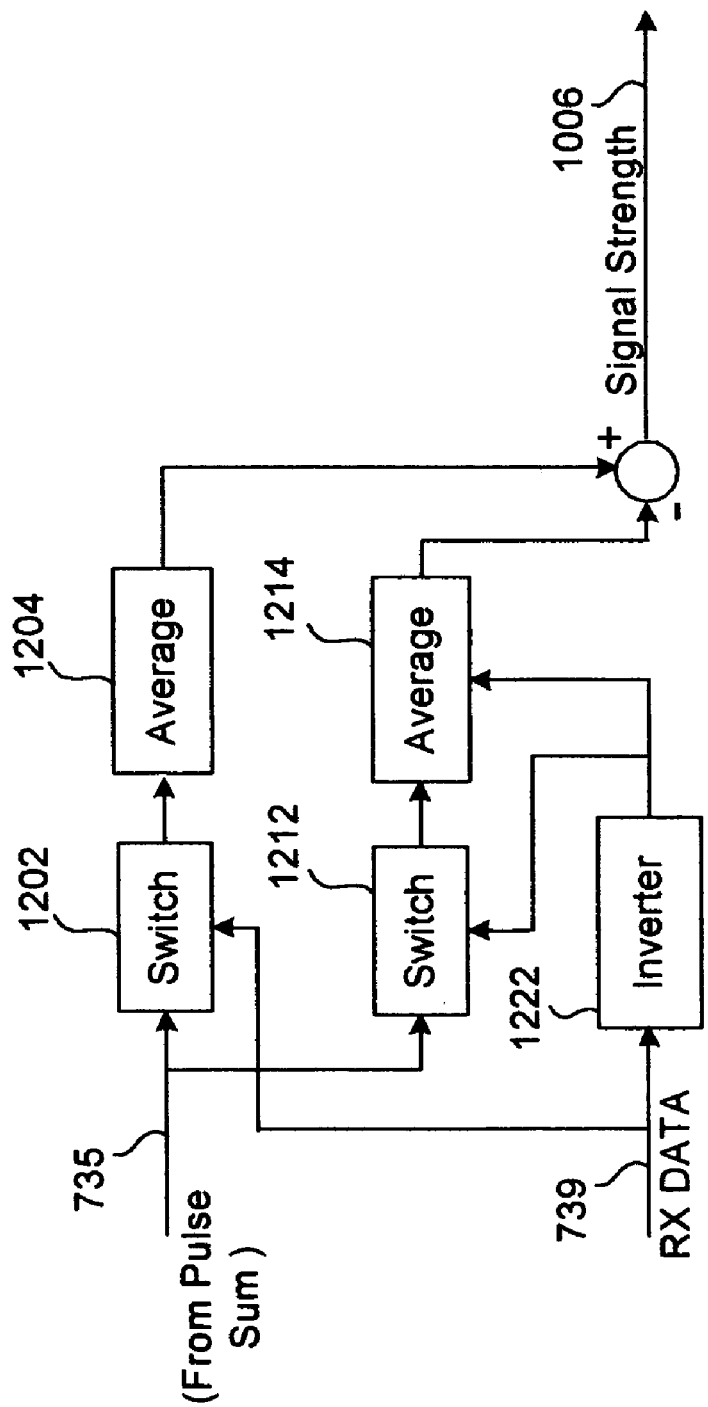
FIG. 12 is a detailed block diagram of one embodiment of the signal evaluator of FIG. 10.

FIG. 12 is a detailed block diagram of an embodiment of signal evaluator 1011 of FIG. 10. Signal evaluator 1011 determines signal strength by measuring the difference between the average voltage associated with a digital "one" and the average voltage associated with a digital "zero". Noise is determined by measuring the variation of these signals, and "signal to noise" is determined by finding the ratio between the signal strength and the noise.

The process for determining signal strength is now described with reference to FIG. 12. FIG. 12 illustrates that two signal paths each determine the average characteristics of the output voltage associated with a detected digital "one" or "zero," respectively. The upper path comprising switch 1202 and average function 1204 operates when the receive data detects a digital "one." The lower path comprising switch 1212 and average function 1214 operates when the receive data detects a digital "zero" according to inverter 1222. It would be apparent to a person skilled in the relevant art that multiple such paths may be implemented corresponding to multiple states of modulation, should such multiple states be implemented in the particular transceiver system. It should also be noted that a single path might be sufficient for many applications, resulting in possible cost savings with potentially some performance degradation.

More specifically, the output signal 735 is fed to either average function 1204 or average function 1214, according to the receive data 739 and inverter 1222, which determines whether the instant signal summation (i.e., the instant of receive data 739) is detected as a "one" or a "zero". If the signal is detected as a digital "one", switch 1202 is closed and average function 1204 receives this signal, while average function 1214 receives no signal and holds its value. If the signal is detected as a digital "zero", switch 1212 is closed and average function 1214 receives this signal, while average function 1204 receives no signal and holds its value.

Average functions 1204 and 1214 determine the average value of their respective inputs over an interval corresponding to when their respective switch is closed. This is not strictly an averaging over time, but an average over the number of input samples. Thus, if there are more ones than zeroes in a given time interval, the average for the ones would reflect the sum of the voltage values for the ones over that interval divided by the number of ones detected in that interval, rather than simply dividing by the length of the interval or number of total samples in the interval. Again, this average can be performed by a running average, or filter elements modified to be responsive to the number of samples rather than time. Whereas the average over the number of samples represents the best mode in that it corrects for an imbalance between the number of ones and zeroes, a simple average over time or filter over time may be adequate for many applications. It should also be noted that a number of averaging functions including, but are not limited to, running average, boxcar average, low pass filter, and others can be used or easily adapted to be used in a manner similar to the examples, as would be apparent to a person skilled in the relevant art.

It should also be appreciated that a simple average based strictly on digital "ones" or "zeroes", rather than the composite that includes both "ones" and "zeroes", can be evaluated with a slight loss of performance to the degree that the average voltage associated with "ones" or the average voltage associated with "zeros" are not symmetrical.

The outputs of averaging functions 1204 and 1214 are combined to achieve signal strength measurement 1006. In the embodiment illustrated, the voltage associated with digital "one" is positive, and the voltage associated with digital zero is negative, thus the subtraction indicated in the diagram, is equivalent to a summation of the two absolute values of the voltages. In the preferred embodiment, the signal strength measurement 1006 could be fairly responsive, i.e. have very little averaging or filtering, in fact it may have no filtering.

It would be apparent to a person skilled in the relevant art that, where some of the diagrams and description may seem to describe an analog implementation, both an analog or a digital implementation are intended. Indeed, the digital implementation, where the functions such as switches, filters, comparators, and gain constants are performed by digital computation is a preferred embodiment. Such a digital implementation can be implemented in an ASIC or by executing computer instructions using a controller as described previously.

V. Determining Separation Distance

V.1. Overview

With reference again to FIG. 9, the received signal strength measured at receiving transceiver 902D represents a transmitted signal strength at transceiver 902A attenuated between transceivers 902A and 902D by radio propagation losses. In an idealized propagation environment, that is, in the absence of significant multipath and signal absorption phenomena, such losses are substantially attributable to a free space signal propagation loss due to the separation distance d1 between transceiver 902A and 902D. Such free space propagation loss is proportional to $1/(d1)^2$, as is known, and the separation distance can be relatively accurately estimated from a known Radio Propagation Path Loss Model (RPPLM) for free space, represented by the generalized equation:

$$P = k_1 r^{-2}$$

Where P is the received signal strength measured at the receiver; r is the separation distance (for example, d1) between the receiver and the transmitter; and $k_1$ is a constant of proportionality incorporating a predetermined signal strength of the transmitted signal at the transmitter.

However, in a non-idealized propagation environment including significant levels of multipath, for example, both the free space radio propagation loss and multipath effects affect the overall propagation loss of signal S1. For example, severe multipath environments tend to attenuate signal S1 more than do medium or low multipath environments. In other words, signal attenuation (that is, propagation loss) becomes a combined function of the multipath environment and the separation distance between transmitting and receiving transceivers. In such environments, an accuracy of the separation distance estimate can be improved when the multipath environment is taken into account. In other words, since the free space RPPLM represented by the equation $P = k_1 r^{-2}$ fails to account for such multipath related attenuation effects, the present invention can improve the separation distance estimate accuracy by using alternative RPPLMs that approximate the multipath attenuation effects in a known multipath environment.

Accordingly, in one embodiment of the present invention, the transceiver classifies or categorizes the multipath environment based on received impulse signal characteristics measured at the receiver. Then the transceiver selects an RPPLM that best-fits the measured multipath environment. For example, the transceiver selects the free space RPPLM when a low multipath environment exists, such as that depicted in previously described FIG. 5C. Then the transceiver estimates the separation distance based on the received impulse signal amplitude and the selected, best-fit RPPLM. Essentially, measured received signal strength is translated to a separation distance using the selected RPPLM.

V.2. Amplitude-Time Multipath Waveform Analysis

Figure 13:
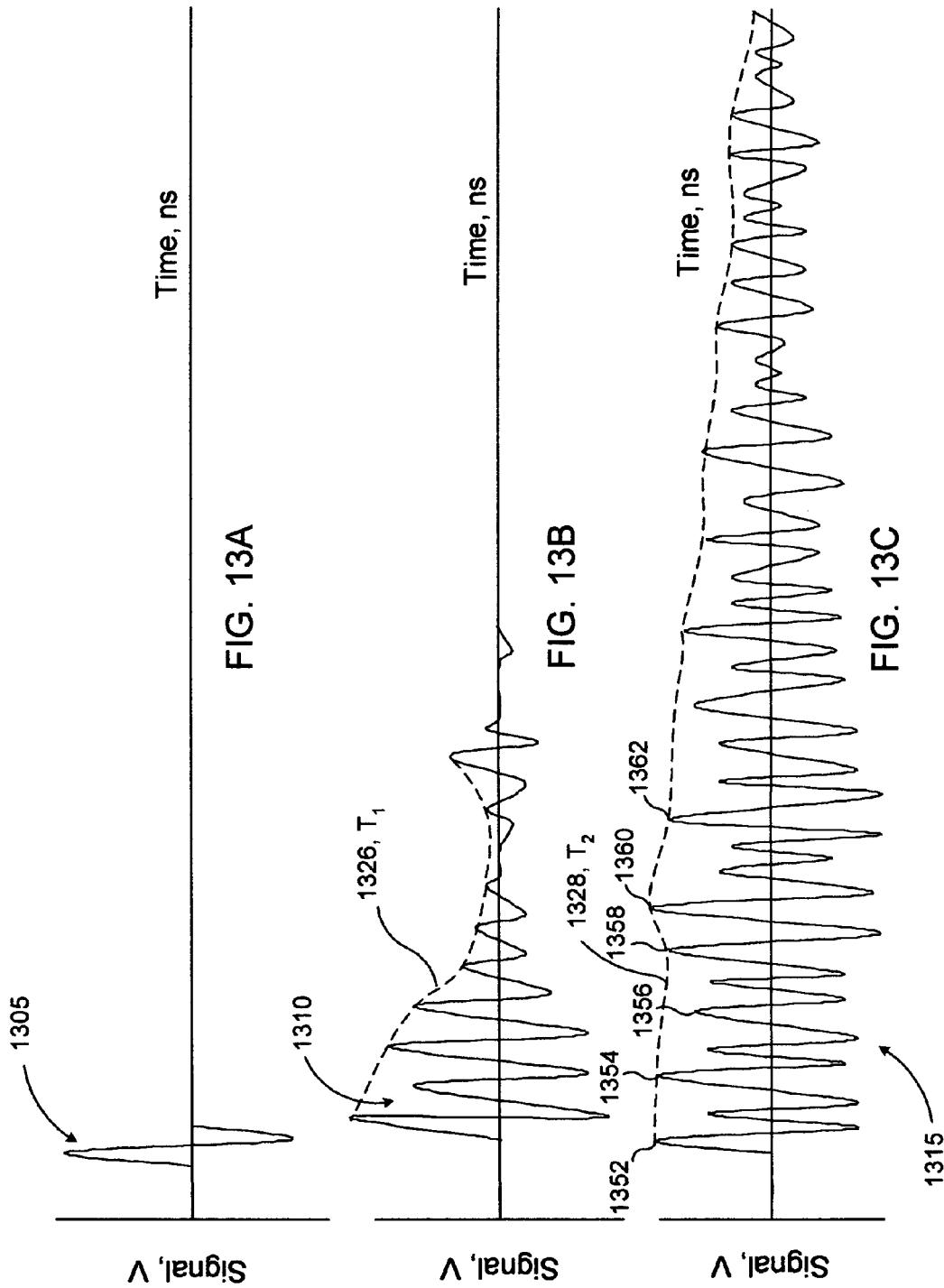
FIG. 13A is a plot of a received impulse signal waveform for a low multipath environment.
FIG. 13B is a plot of a received impulse signal waveform for a medium multipath environment.
FIG. 13C is a plot of a received impulse signal waveform for a high multipath environment.

The transceiver classifies the multipath environment to select a best-fit RPPLM, based on an amplitude-time analysis of the received impulse signal waveform. Exemplary, received UWB or medium-WB impulse signal waveforms 1305, 1310 and 1315 are respectively depicted in FIGS. 13A, 13B and 13C, and are the same waveforms depicted and described in connection with FIGS. 5C, 5D and 5E, respectively. Thus, waveforms 1305, 1310 and 1315 respectively correspond to low, medium and high multipath environments. In one embodiment, the multipath environment is classified according to a multipath amplitude decay time, T, of multipath energy in the received impulse signal waveform. With reference to FIGS. 13A–13C, waveform 1305 includes minimal or no multipath energy. Thus, a multipath amplitude decay time of waveform 1305 is correspondingly minimal or zero. On the other hand, waveform 1310 includes a moderate amount of multipath energy represented by a plurality of multipath impulse signals. The multipath impulse signals collectively exhibit an amplitude profile or envelope 1326 (depicted in dotted line in FIG. 13B) having an amplitude decay time $T_1$. Similarly, waveform 1315 exhibits a decaying multipath amplitude profile 1328 having an amplitude decay time $T_2$, where $T_2$ is greater than $T_1$ because waveform 1315 represents a more severe multipath environment than does waveform 1310.

To classify the multipath environment in the present invention, the multipath amplitude decay time T of the received impulse signal is compared to a predetermined, multipath amplitude decay time range associated with each type of multipath environment, for example, to a low, a medium and a high multipath environment decay time range. The comparison matches the decay time T to one of the predetermined decay time ranges and thus to an associated multipath environment, to classify the multipath environment. Once the multipath environment is classified or matched, a best-fit RPPLM associated with the matched multipath environment is selected, and received signal strength measurements are then more accurately translated to separation distance estimates using the best-fit RPPLM.

V.3. Radio Propagation Path Loss Models (RPPLMs)

The present invention estimates separation distance using any one, or a combination, of the following RPPLMs, depending on the multipath environment.

In a low multipath environment, distance is estimated using the previously described free space RPPLM represented by the equation $P=k_1 r^{-2}$. Also, the separation distance estimate is based on a received impulse signal having a greatest signal strength, since the received signal waveform includes minimal multipath energy.

Alternatively, in a medium multipath environment, for example, a RPPLM according to the following equation can be used to estimate separation distance:

$$P = k_2 r^{a_2}$$

Where P is the received signal strength measured at the receiver;

$a_2$ is a real number in the approximate range of $-2$ to $-4$;

r is the separation distance between the receiver and the transmitter; and $k_2$ is a constant of proportionality incorporating a predetermined signal strength of the transmitted signal at the transmitter.

Since a plurality of received impulse signals including multipath signals are received, the separation distance estimate can be further refined using a signal strength P of a prudently selected one of the plurality of received impulse signals. For example, one approach is to base the separation distance estimate on signal strength P of a received impulse signal having an earliest time-of-arrival at the receiver among the plurality of received impulse signals. For example, with reference to FIG. 13, waveform 1310, the signal strength P of an impulse signal 1350 having an earliest time of arrival among the other impulse signals in the waveform is used to estimate separation distance.

In another approach in a medium or high multipath environment, for example, a RPPLM according to the following equation can be used to estimate separation distance:

$$P_{avg} = k_3 r^{a_3}$$

Where $a_3$ is a real number in the approximate range of $-2$ to $-4$;

$k_3$ is a constant of proportionality incorporating a predetermined signal strength of the transmitted signal at the transmitter; and $P_{avg}$ is an average signal strength of between two and five of the plurality of received impulse signals having the greatest signal strengths among the plurality of the of received impulse signals. For example, with reference to FIG. 13C, waveform 1315, includes time-ordered impulse signal peaks 1352, 1354, 1356, 1358, 1360, and 1362. $P_{avg}$ can be computed using the signal strengths of the five strongest impulse signal peaks 1352, 1354, 1358, 1360 and 1362.

In still another approach, in a medium or high multipath environment, the separation distance estimate can be based on the amplitude decay time T, for example, on amplitude decay time $T_1$ or $T_2$ of respective waveform 1310 or 1315.

The above mentioned constants $a_1$, $a_2$, $a_3$, $k_1$, $k_2$, and $k_3$ can be determined during a product engineering development phase by curve fitting empirical data representative of a typical propagation environment. Typical propagation environments can include indoor or outdoor environments, where outdoor environments can include urban and rural settings. It is envisioned that a given receiver of the present invention will be sold to a consumer and used in one such typical environment, whereby the receiver can be initially configured at the point-of-sale with the constants corresponding to the environment. In another embodiment, the receiver can be configured with a plurality of alternative constants sets (for example, $a_1/k_1$, $a_2/k_2$, and $a_3/k_3$) each selectable by the user, whereby the user can alternatively configure the receiver to operate in a variety of typical environments. Alternatively, the receiver can automatically select an appropriate constant set from amongst the plurality of constant sets based on a characterization of the received multipath signals.

V.4. Detailed Process for Estimating Separation Distance

Figure 14:
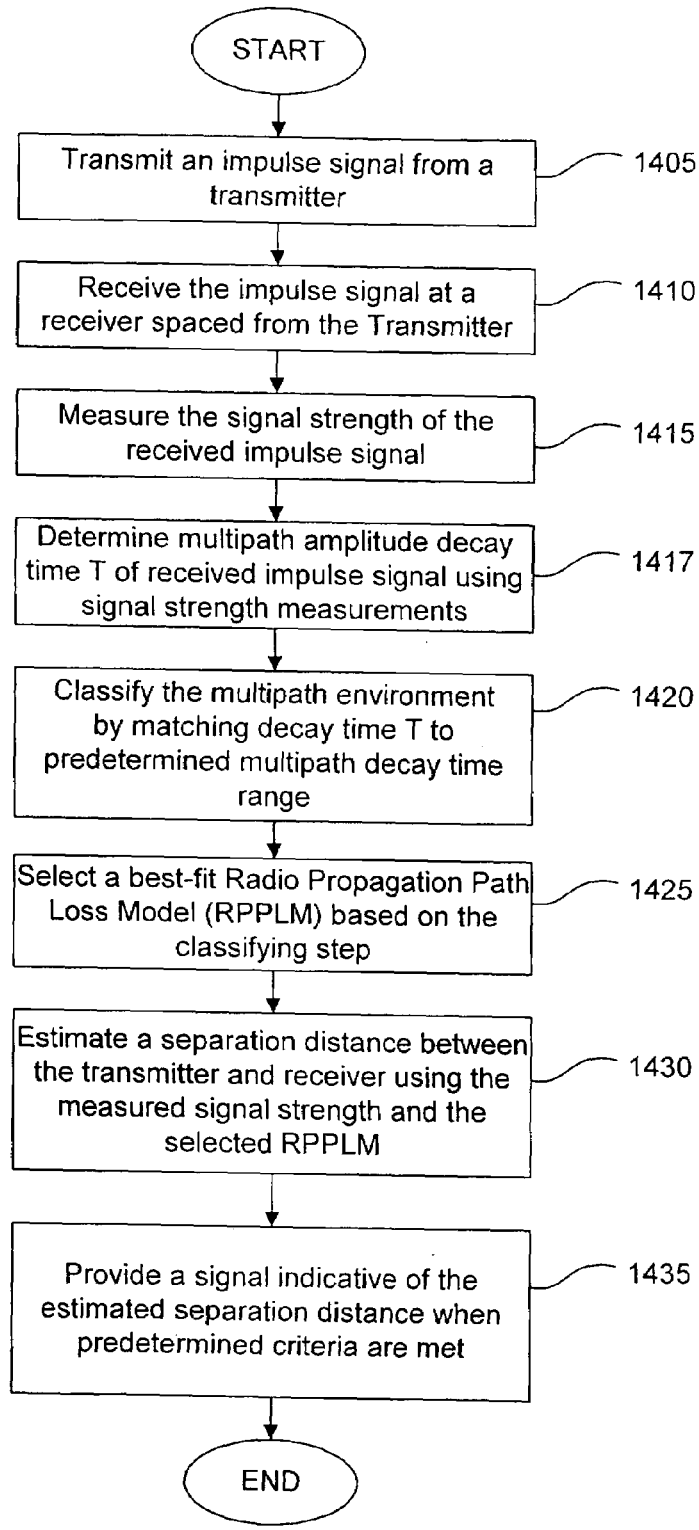
FIG. 14 is a flowchart of an exemplary method of estimating a separation distance between the transceivers of FIG. 9, according to an embodiment of the present invention.

FIG. 14 is a flowchart of an exemplary method of estimating the separation distance between transceiver 902 and an originating transmitter according to one embodiment of the present invention. The process of FIG. 14 is described with reference to the example environment depicted in FIGS. 9 and 10. The process begins at a step 1405 when transceiver 902A transmits an ultra-wideband impulse signal S1. At a step 1410, transceiver 902D receives signal S1. At a step 1415, transceiver 902D measures a signal strength or amplitude 1006 of the received impulse signal using signal evaluator 1011. Signal evaluator 1011 passes measured amplitude 1006 to processor 1022 of processing subsystem 1020.

At steps 1417 and 1420, processor 1022 classifies a propagation environment of impulse signal S1 as described above. For example, the propagation environment of impulse signal S1 can be classified as having one of low, intermediate, and high levels of multipath. To classify the multipath environment, at a first step 1417, processor 1022 determines a multipath decay time T of the received impulse signal waveform using at least one measured amplitude 1006. One method of determining multipath decay time T includes the steps of a) amplitude sampling the received signal waveform (for example, waveform 1315 of FIG. 13C), b) filtering the resulting amplitude samples with a low pass filter having a filter time constant sufficiently long to smooth or integrate the amplitude samples into an amplitude envelope (such as envelope 1328 of waveform 1315), and c) examining the envelope to determined the decay time of the envelope.

A scanning receiver can be used to achieve such amplitude sampling of the received signal. The scanning receiver can include a single scanning correlator (similar to the correlator described in connection with FIG. 7) or multiple scanning correlators to sample the received signal. In a scanning impulse radio receiver having one or more correlators and useable with the present invention, the one or more correlators are used to detect data and to synchronize the receiver with a received impulse radio signal. Additional details and uses of scanning receivers with multiple correlators are disclosed in commonly owned and concurrently filed U.S. patent application Ser. No. 09/537,264, entitled "System and Method Utilizing Multiple Correlator Receivers in an Impulse Radio System, now abandoned, which is incorporated herein by reference in its entirety.

At second step 1420, processor 1022 matches the multipath amplitude decay time T to one of a plurality of predetermined multipath amplitude decay time ranges stored in memory 1024. Each of the predetermined multipath amplitude decay time ranges is associated with at least one RPPLM, as described above.

Alternative methods of classifying the multipath environment can be used. For example, a multipath energy measurement over a predetermined time interval can be used to quantify the multipath energy, to thereby classify the multipath environment based on the multipath energy measurement. Any other method apparent to a person skilled in the relevant art can be used to classify the multipath environment.

At a step 1425, processor 1022 selects a best-fit RPPLM associated with the predetermined decay time range matching the decay time T in accordance with the multipath environment classified in previous steps 1470 and 1420.

At a step 1430, processor 1022 estimates the separation distance between originating transceiver 902A and receiving transceiver 902D using measured signal strength 1006 and the selected best-fit RPPLM. Essentially, processor 1022 translates measured signal strength 1006 to a corresponding separation distance estimate using the RPPLM. In one embodiment, processor 1022 uses a table-lookup technique to estimate separation distance. In this embodiment, a plurality of predetermined separation distance lookup tables are stored in memory 1024. Each lookup table corresponds to a different RPPLM and includes a set of table entries each relating an amplitude to a predetermined separation distance calculated using the RPPLM associated with the lookup table. To estimate the separation distance, processor 1022 accesses a lookup table associated with the selected best-fit RPPLM. Processor 1022 matches measured amplitude 1006 to a lookup table entry (in the selected lookup table) having an amplitude nearest measured amplitude 1006. The estimated separation distance is the predetermined separation distance associated with the matched lookup table entry.

In an alternative embodiment, processor 1022 translates measured signal strength 1006 to a corresponding separation distance without reference to an RPPLM look-up table. Instead, processor 1022 translates signal strength 1006 to the separation distance in real-time using the appropriate RPPLM equation.

At a step 1435, processor 1022 provides a signal indicative of the separation distance to the user via I/O subsystem 1030. For example, the estimated separation distance can be displayed to the user using an LED display device. Also, an audible alarm can be sounded if processor 1022 determines the estimated distance exceeds a predetermined separation distance stored in memory 1024. In an embodiment wherein transceiver 902D is networked to a central control station via a communication link, the estimated separation can be transmitted in a message from transceiver 902D to the central controller over the communication link. Also, the estimated separation can be transmitted in a message to other impulse radio transceivers.

An alternative approach of estimating the separation distance omits multipath environment classifying steps 1417 and 1420, and selecting step 1425 altogether. In this simplified embodiment, a default RPPLM is used to translate signal strength measurement 1006 to a separation distance.

VI. Exemplary Transceiver Computer System

Figure 15:
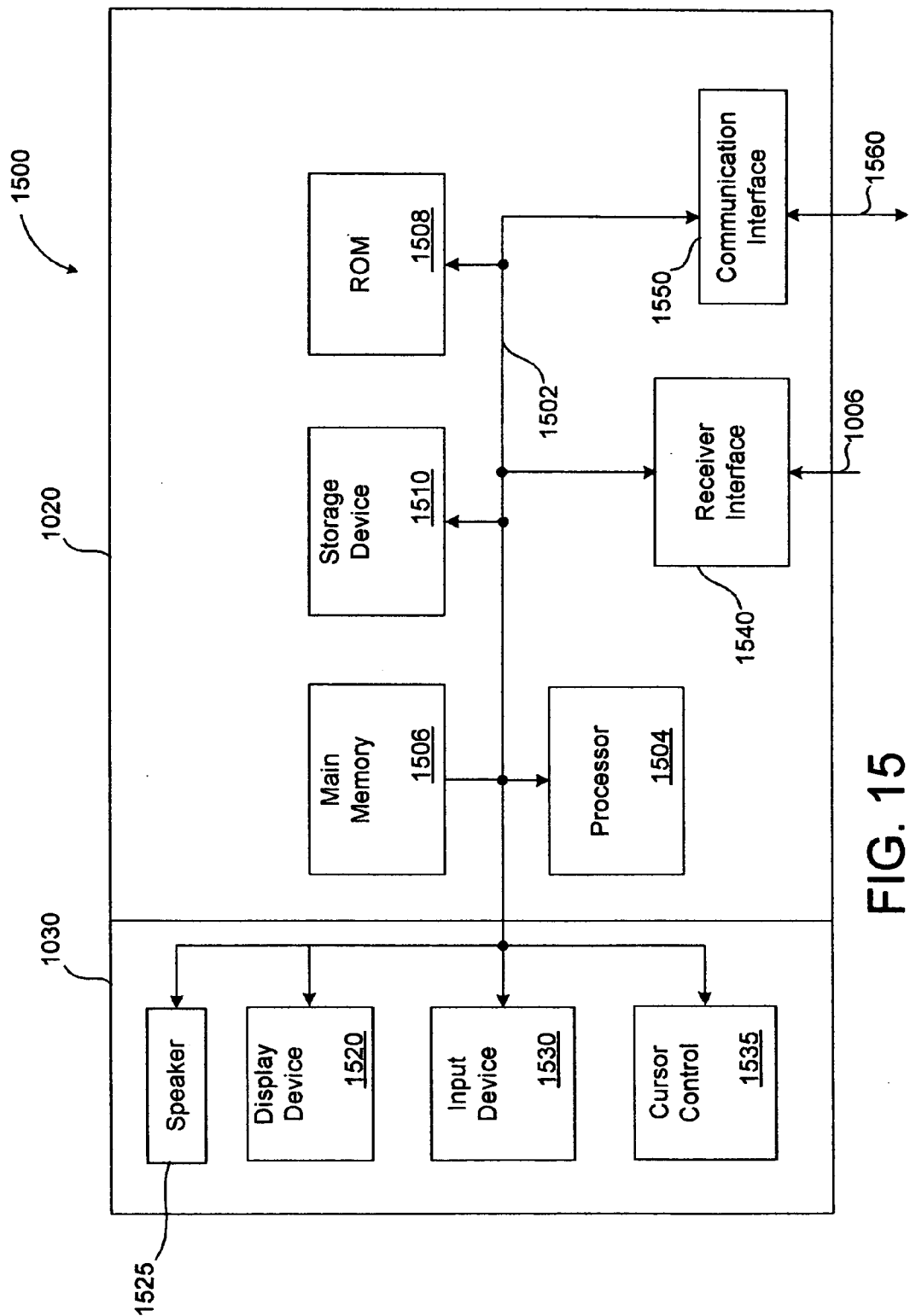
FIG. 15 is a high level block diagram of an exemplary computer system with which the method of FIG. 14 can be implemented.

FIG. 15 is a block diagram illustrating an exemplary computer system 1500 with which the methods of the present invention can be implemented. Computer system 1500 includes a bus 1502 or other communication mechanism for communicating information, and a processor 1504 coupled to the bus 1502 for processing information. Computer system 1500 also includes a main memory 1506, such as a random access memory (RAM) or other dynamic storage device, coupled to the bus 1502 for storing information and instructions to be executed by processor 1504. Main memory 1506 can be used for storing temporary variables or other intermediate information during execution of instructions to be executed by processor 1504. Computer system 1500 further includes a read only memory (ROM) 1508 or other static storage device coupled to the bus 1502 for storing static information and instructions for the processor 1504. A storage device 1510, such as a magnetic disk or optical disk, is provided and coupled to the bus 1502 for storing information and instructions.

Computer system 1500 includes display 1520, such as a flat panel display, a Liquid Crystal Display (LCD), or Light Emitting Diode (LED) display, for displaying information to a user. Display 1520 is coupled to bus 1502. An audio speaker 1525 coupled with bus 1502 can be used to provide audible indicators, such as alarms, to the user. Input device 1530 is coupled to bus 1502 for communicating information and command selections to the processor 1504. Input device 1530 can include a keypad having alphanumeric and other keys, and can include a voice recognition input device. Another type of user input device is a cursor control 1535, such as a mouse, a trackball, or cursor direction keys for communicating direction information and command selections to processor 1504 and for controlling cursor movement on display 1520, if so desired.

Computer system 1500 estimates separation distances and provides indicators to a user in accordance with the present invention in response to processor 1504 executing sequences of instructions contained in main memory 1506. Such instructions can be read into main memory 1506 from another computer-readable medium, such as a storage device 1510. Execution of the sequences of instructions contained in the main memory 1506 causes the processor 1504 to perform the process steps described above in connection with FIG. 14. In alternative embodiments, hard-wired circuitry, or ASICs can be used in place of or in combination with computer software instructions to implement the invention. Thus, embodiments of the invention are not limited to any specific combination of hardware circuitry and software.

Computer system 1500 also includes a receiver interface 1540 coupled to bus 1502. Receiver Interface 1540 receives measured amplitude signal 1006 from signal evaluator 1011 and converts signal 1006 to a format compatible with bus 1502 and processor 1504. Computer system 1500 optionally includes a communication interface 1550 coupled to bus 1502. Communication Interface 1550 provides two-way data communication over an interface mechanism 1560 between computer system 1500 and another impulse radio transceiver, computer system, or a local or global network, using techniques that would be apparent to a person of skill in the relevant art.

It is to be understood that although a computer system for implementing the processes of the present invention has just been described, such processes can be implemented using an analog architecture or a hybrid analog-digital processor architecture.

VII. Exemplary Transceiver Comparator System

Figure 16:
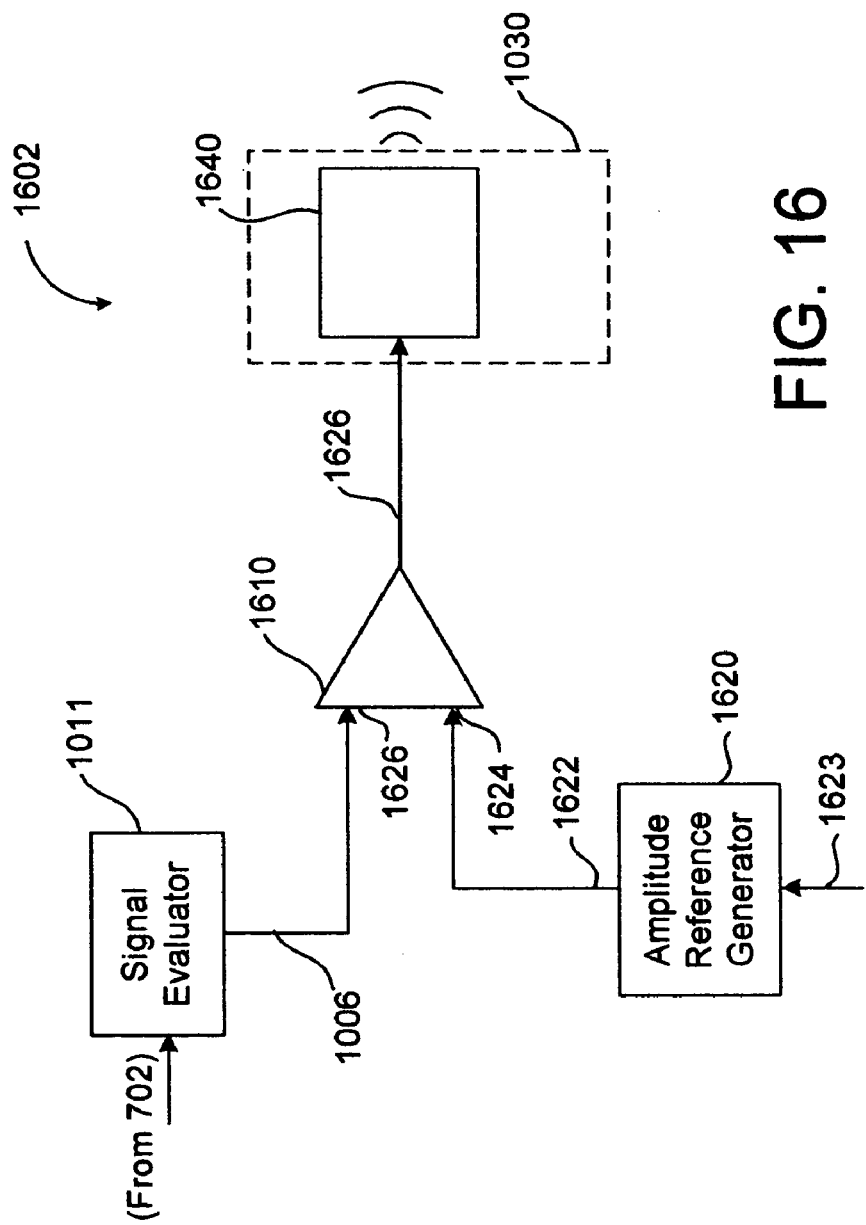
FIG. 16 is a block diagram of a portion of an impulse receiver including a comparator according to an alternative embodiment of the present invention.

A diagram of a simplified impulse signal transceiver 1602 according to an alternative embodiment of the present invention, is depicted in FIG. 16. Simplified transceiver 1602 retains receiver 702 and signal evaluator 1011 of transceiver 902 (see FIG. 9), but replaces processing subsystem 1020 of transceiver 902 with a comparator 1610 and a reference signal generator 1620. Reference signal generator 1620 outputs a reference signal 1622 having an amplitude, such as a voltage level, indicative of a predetermined separation distance between transceiver 1602 and an originating transmitter. Reference generator 1620 includes an input 1623 for adjusting the amplitude of reference signal 1622 to a desired level. Reference generator 1620 can be a simple voltage divider in an analog configuration of transceiver 1602. Reference generator 1620 supplies reference signal 1622 to a reference input 1624 of comparator 1610, while signal evaluator 1011 supplies measured amplitude 1006 to an evaluation input 1626 of comparator 1610. Comparator 1610 includes an output 1626 coupled to and capable of driving an audio generator, which in turn drives an audible speaker coupled to the audio generator. The audio generator and audible speaker are collectively indicated by reference numeral 1640 in FIG. 16, and form part of I/O subsystem 1030.

Comparator 1610 compares measured amplitude 1006 applied to evaluation input 1626 against the amplitude of reference signal 1622 applied to reference input 1624, in a manner apparent to one of skill in the relevant art. When measured amplitude 1006 exceeds reference amplitude 1622, comparator 1610 drives audio generator and speaker 1640, thus producing an audible indication to a user that a separation distance between transceiver 1602 and the originating transmitter exceeds a predetermined distance represented by the amplitude of reference signal 1622. Accordingly, comparator 1610 "estimates" separation distance based on the measured signal strength to the extent comparator 1610 indicates to the user that the "estimated distance" between the receiver and transmitter exceeds the predetermined separation distance.

VIII. CONCLUSION

While various embodiments of the present invention have been described above, it should be understood that they have been presented by way of example, and not limitation. For instance, although the exemplary system embodiment in this patent application is an impulse radio using a 2.0 GHz center frequency, impulse radio systems with a center frequency from below audio to microwave, millimeter wave, teraHertz, and even optical frequencies may benefit from this invention.

Thus the breadth and scope of the present invention should not be limited by any of the above-described exemplary embodiments, but should be defined only in accordance with the following claims and their equivalents.

The invention claimed is:

1. A method for locating an impulse radio, comprising:
    communicating impulse signals between a first impulse radio and a plurality of second impulse radios;
    performing a received signal strength measurement for each of the impulse signals;
    selecting one of a plurality of radio propagation path models;
    estimating a separation distance between the first impulse radio and each of the plurality of second impulse radios based on a corresponding one of the received signal strength measurements and the radio propagation path model to produce a plurality of separation distances; and
    determining a location relating to the first impulse radio based on the plurality of separation distances.

2. The method of claim 1, wherein the first impulse radio comprises an impulse radio transmitter and at least one of the plurality of second impulse radios comprises an impulse radio receiver.

3. The method of claim 1, wherein the first impulse radio comprises an impulse radio receiver and at least one of the plurality of second impulse radios comprises an impulse radio transmitter.

4. The method of claim 1, wherein at least one of the first impulse radio and the second impulse radio comprises one of a hand held unit, a mobile unit, and a fixed unit.

5. The method of claim 1 further comprises classifying a multipath environment for selecting one of the radio propagation path models.

6. The method of claim 5, wherein the multipath environment is classified based on a signal strength decay envelope.

7. The method of claim 1, wherein each of the impulse signals has one of ultra-wideband frequency characteristics and medium wideband frequency characteristics.

8. The method of claim 1 further comprises determining a decay time of at least one of the impulse signals.

9. The method of claim 8, wherein said selecting a radio propagation path model comprises:
matching the decay time to one of a plurality of predetermined decay time ranges, each decay time range being associated with a respective one of a plurality of radio propagation path models; and
selecting a radio propagation path model associated with the matched decay time range.

10. The method of claim 1, wherein the radio propagation path model is selected from one of:

$$P = k_1 r^{a_1}, \quad (1)$$

$$P = k_2 r^{a_2}, \text{ and} \quad (2)$$

$$P_{avg} = k_3 r^{a_3}, \quad (3)$$

where
P represents a signal strength of a received impulse signal,
$P_{avg}$ is an average signal strength of a predetermined number of received impulse signals,
$k_1$, $k_2$, and $k_3$ are proportionality constants,
$a_1$, $a_2$, and $a_3$ are real numbers in the approximate range of $-2$ to $-4$, and
r is a separation distance between the transmitter and the receiver.

11. A method for locating an impulse radio transmitter, comprising:
transmitting an impulse signal from the impulse radio transmitter;
receiving the impulse signal at each of a plurality of impulse radio receivers;
performing a received signal strength measurement for the impulse signal at each of the plurality of impulse radio receivers;
selecting one of a plurality of radio propagation path models;
estimating a separation distance between each of the plurality of impulse radio receivers and the impulse radio transmitter based on a corresponding one of the received signal strength measurements and the selected radio propagation path model to produce a plurality of separation distances; and
determining a location relating to the impulse radio transmitter based on the plurality of separation distances.

12. A method for locating an impulse radio receiver, comprising:
transmitting an impulse signal from a plurality of impulse radio transmitters;
receiving the impulse signals at the impulse radio receiver;
performing a received signal strength measurement for each of the impulse signals;
selecting one of a plurality of radio propagation path models;
estimating a separation distance between each of the plurality of impulse radio transmitters and the impulse radio receiver based on a corresponding one of the received signal strength measurements and the selected radio propagation path model to produce a plurality of separation distances; and
determining a location relating to the impulse radio receiver based on the plurality of separation distances.

13. A system for locating an impulse radio, comprising:
a first impulse radio; and
a plurality of second impulse radios communicating impulse signals with said first impulse radio;
at least one received signal strength indicator that performs a received signal strength measurement for the impulse signals;
at least one signal evaluator that selects one of a plurality of radio propagation path models; and
at least one processor that estimates a separation distance between the first impulse radio and each of the plurality of second impulse radios based on a corresponding one of the received signal strength measurements and the selected radio propagation path model to produce a plurality of separation distances, said plurality of separation distances being used for determining a location relating to the first impulse radio.

14. The system of claim 13, wherein the first impulse radio comprises an impulse radio transmitter and at least one of the plurality of second impulse radios comprises an impulse radio receiver.

15. The system of claim 13, wherein the first impulse radio comprises an impulse radio receiver and at least one of the plurality of second impulse radios comprises an impulse radio transmitter.

16. The system of claim 13, wherein at least one of the first impulse radio and the second impulse radio comprises one of a hand held unit, a mobile unit, and a fixed unit.

17. The system of claim 13, wherein a multipath environment is classified to select one of the radio propagation path models.

18. The system of claim 17, wherein the multipath environment is classified based on a signal strength decay envelope.

19. The system of claim 17, the multipath environment is classified by determining a decay time of at least one of the impulse signals.

20. The system of claim 19, wherein said signal evaluator selects a radio propagation path model by matching the decay time to one of a plurality of predetermined decay time ranges, each decay time range being associated with a respective one of a plurality of radio propagation path models; and by
selecting a radio propagation path model associated with the matched decay time range.

21. The system of claim 13, wherein each of plurality of impulse signals has one of ultra-wideband frequency characteristics and medium wideband frequency characteristics.

22. The system of claim 13, wherein the radio propagation path model is selected from one of:

$$P = k_1 r^{a_1}, \quad (1)$$

$$P = k_2 r^{a_2}, \text{ and} \quad (2)$$

$$P_{avg} = k_3 r^{a_3}, \quad (3)$$

where
P represents a signal strength of a received impulse signal,
$P_{avg}$ is an average signal strength of a predetermined number of received impulse signals,
$k_1$, $k_2$, and $k_3$ are proportionality constants,
$a_1$, $a_2$, and $a_3$ are real numbers in the approximate range of $-2$ to $-4$, and
r is a separation distance between the transmitter and the receiver.

23. A system for locating an impulse radio transmitter, comprising:
- a plurality of impulse radio receivers for receiving an impulse signal transmitted from the impulse radio transmitter;
- at least one received strength signal indicator that performs a received signal strength measurement on the impulse signal at each of the plurality of impulse radio receivers;
- at least one signal evaluator that selects one of a plurality of radio propagation path models; and
- at least one processor that estimates a separation distance between each of the plurality of impulse radio receivers and the impulse radio transmitter based on a corresponding one of the received signal strength measurements and the selected radio propagation path model to produce a plurality of separation distances, said plurality of separation distances being used for determining a location relating to the impulse radio transmitter.

24. A system for locating an impulse radio receiver, comprising:
- a plurality of impulse radio transmitters each transmitting an impulse signal;
- an impulse radio receiver for receiving the impulse signals;
- a received signal strength indicator that performs a received signal strength measurement for each of the impulse signals;
- a signal evaluator that selects one of a plurality of radio propagation path models; and
- a processor that estimates a separation distance between each of the plurality of impulse radio transmitters and the impulse radio receiver based on a corresponding one of the received signal strength measurements and the selected radio propagation path model to produce a plurality of separation distances, said plurality of separation distances being used for determining a location relating to the impulse radio receiver.

* * * * *